(12) United States Patent
Endo et al.

(10) Patent No.: US 7,716,256 B2
(45) Date of Patent: May 11, 2010

(54) INFORMATION NAVIGATION SYSTEM

(75) Inventors: Susumu Endo, Kawasaki (JP); Takayuki Baba, Kawasaki (JP); Shuichi Shiitani, Kawasaki (JP); Yusuke Uehara, Kawasaki (JP); Daiki Masumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 552 days.

(21) Appl. No.: 10/845,150

(22) Filed: May 14, 2004

(65) Prior Publication Data
US 2004/0210558 A1 Oct. 21, 2004

Related U.S. Application Data

(63) Continuation of application No. PCT/JP02/11992, filed on Nov. 18, 2002.

(30) Foreign Application Priority Data
Nov. 19, 2001 (JP) .............................. 2001-352569

(51) Int. Cl.
G06F 7/00 (2006.01)
(52) U.S. Cl. .................. 707/805; 707/919; 707/920
(58) Field of Classification Search ............... 707/1–10, 707/100–102, 104.1, 200–201, 798, 805, 707/919, 920; 715/513, 531, 205, 854; 709/225; 345/619
See application file for complete search history.

(56) References Cited

U.S. PATENT DOCUMENTS

| 5,644,740 | A | * | 7/1997 | Kiuchi | 715/853 |
| 5,649,193 | A | * | 7/1997 | Sumita et al. | 707/103 R |
| 5,875,446 | A | * | 2/1999 | Brown et al. | 707/3 |
| 5,877,766 | A | * | 3/1999 | Bates et al. | 715/854 |
| 5,893,122 | A | * | 4/1999 | Tabuchi | 715/209 |
| 5,963,208 | A | * | 10/1999 | Dolan et al. | 715/760 |
| 5,991,756 | A | * | 11/1999 | Wu | 707/3 |
| 6,003,040 | A | * | 12/1999 | Mital et al. | 707/103 R |
| 6,018,344 | A | * | 1/2000 | Harada et al. | 715/818 |
| 6,026,403 | A | * | 2/2000 | Siefert | 707/10 |
| 6,038,560 | A | * | 3/2000 | Wical | 707/5 |

(Continued)

FOREIGN PATENT DOCUMENTS

JP 10-187750 7/1998

(Continued)

OTHER PUBLICATIONS

Information Processing Society of Japan Kenkyo Hokoku, vol. 97, No. 2, Hisashi Shimamura et al., "A Graphical Browser for WWW Navigation", Jan. 16, 1997, pp. 9-17.

(Continued)

Primary Examiner—Miranda Le
(74) Attorney, Agent, or Firm—Staas & Halsey LLP

(57) ABSTRACT

An information navigation system for supporting browsing of data which are linked mutually includes an starting point determination supporter, a browsing supporter, and a positioning supporter. The starting point determination supporter supports detection of first data being a starting point for an information navigation. The browsing supporter displays the first data and second data linked to the first data as in a virtual space, to allow a user to select data to be browsed next. The positioning supporter displays a current browsing position on a map which indicates a relation between all data.

9 Claims, 22 Drawing Sheets

U.S. PATENT DOCUMENTS

| | | | |
|---|---|---|---|
| 6,154,213 A * | 11/2000 | Rennison et al. | 715/854 |
| 6,189,012 B1 * | 2/2001 | Mital et al. | 707/103 R |
| 6,189,019 B1 * | 2/2001 | Blumer et al. | 715/205 |
| 6,233,571 B1 * | 5/2001 | Egger et al. | 707/2 |
| 6,393,427 B1 * | 5/2002 | Vu et al. | 707/101 |
| 6,539,387 B1 * | 3/2003 | Oren et al. | 707/100 |
| 6,549,220 B1 * | 4/2003 | Hsu et al. | 715/854 |
| 6,556,983 B1 * | 4/2003 | Altschuler et al. | 706/55 |
| 6,557,015 B1 * | 4/2003 | Bates et al. | 715/229 |
| 6,562,077 B2 * | 5/2003 | Bobrow et al. | 715/517 |
| 6,584,468 B1 * | 6/2003 | Gabriel et al. | 707/10 |
| 6,631,496 B1 * | 10/2003 | Li et al. | 715/200 |
| 6,714,936 B1 * | 3/2004 | Nevin, III | 707/102 |
| 6,785,667 B2 * | 8/2004 | Orbanes et al. | 707/1 |
| 6,842,755 B2 * | 1/2005 | Maslov | 707/10 |
| 6,862,710 B1 * | 3/2005 | Marchisio | 715/206 |
| 6,883,138 B2 * | 4/2005 | Rosenholtz et al. | 715/207 |
| 6,901,553 B1 * | 5/2005 | Hayashi et al. | 715/501.1 |
| 6,903,756 B1 * | 6/2005 | Giannini | 715/747 |
| 6,904,427 B1 * | 6/2005 | Hagiwara et al. | 707/3 |
| 6,981,040 B1 * | 12/2005 | Konig et al. | 709/224 |
| 7,007,008 B2 * | 2/2006 | Goel et al. | 707/3 |
| 7,117,434 B2 * | 10/2006 | Novaes | 715/513 |
| 2001/0056498 A1 * | 12/2001 | Kohda et al. | 709/238 |
| 2002/0059181 A1 * | 5/2002 | Kohda et al. | 707/1 |
| 2002/0109680 A1 * | 8/2002 | Orbanes et al. | 345/418 |

FOREIGN PATENT DOCUMENTS

WO  03/044693  5/2003

OTHER PUBLICATIONS

Hisashi Shimamura, "A Graphical Browser for WWW Navigation", IPSJ Technical Report, Information Processing Society of Japan (IPSJ), Jan. 16, 1997, vol. 97, No. 2, pp. 9 to 16.

Japanese Patent Office Action, mailed Jun. 24, 2008 and issued in corresponding Japanese Patent Application No. 2003-546261.

Office Action mailed on Oct. 21, 2008 and issued in corresponding Japanese Patent Application No. 2003-546261 (3 pages), English Translation (3 pages).

* cited by examiner

FIG.5

KEYWORD: AKIHABARA ELECTRIC  [SEARCH] HELP
[INCLUDE ALL]  [RELATED WORD]

DATE
○ ALL
○ [ ]/[ ]/[ ] - 1999/12/03

SEARCH DATABASE Japanese News

[IMAGE SEARCH]  [CONDITION SAVE]

GROUP 1:
DOCUMENT: PROPOSAL 1/7/2001, STATEMENT OF DELIVERY 3/2/1999

EMPLOYEE INFORMATION: MR. UEHARA (SALES), MR. ENDO (SALES)

BUSINESS COUNTERPART INFORMATION: OBATA TRANSPORT (DISTRIBUTION), AKIHABARA ELECTRIC (CUSTOMER)

GROUP 2:
BUSINESS COUNTERPART INFORMATION: AKIHABARA ELECTRIC COMMUNICATION EQUIPMENTS (CUSTOMER)

PRODUCT INFORMATION: PRODUCT INFORMATION 1/8/2000

EMPLOYEE INFORMATION: MR. SHIIYA (SALES)

GROUP 3:
DOCUMENT: CUSTOMER INFORMATION RESEARCH DOCUMENT 1/7/1998

15

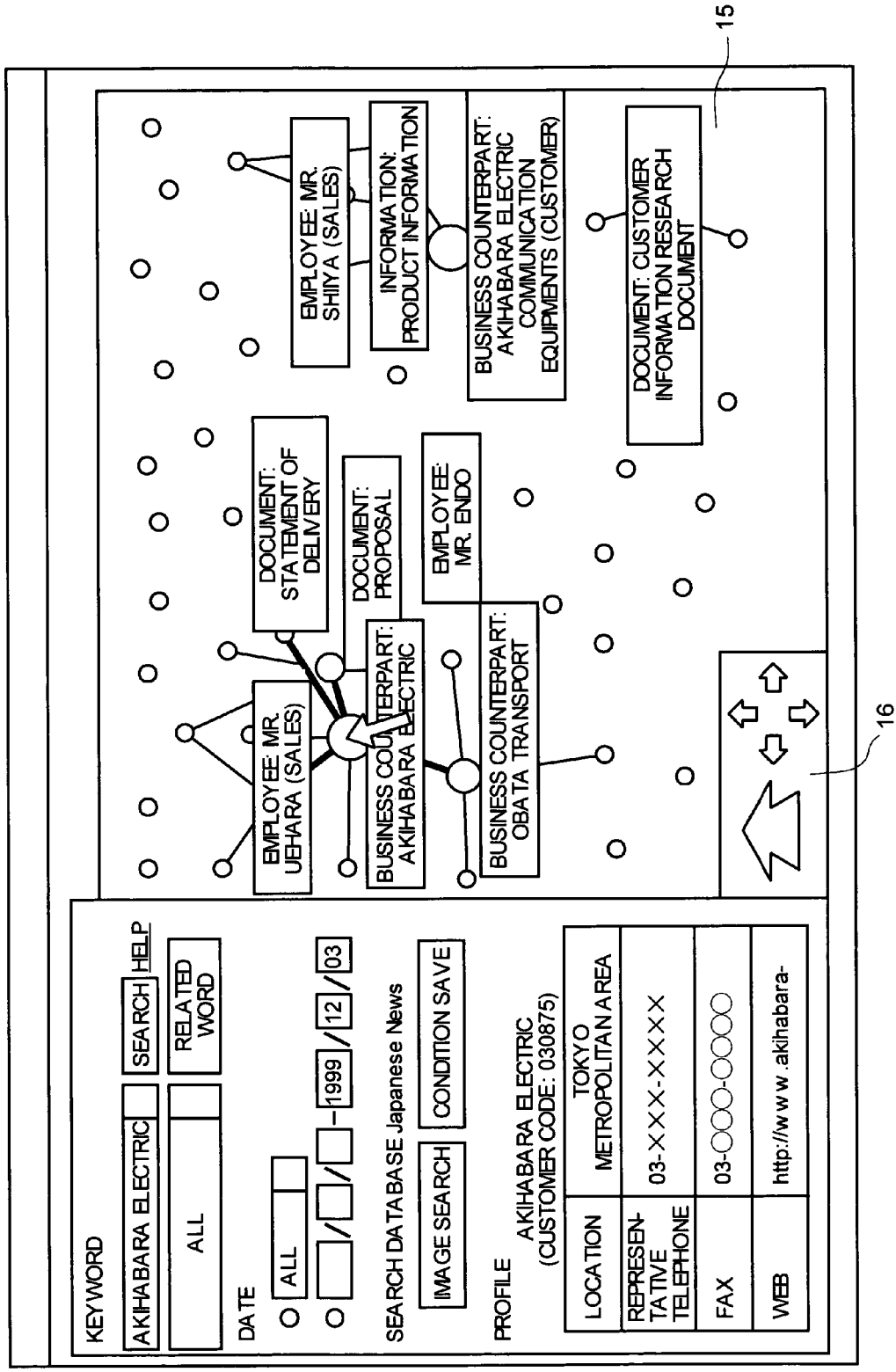

FIG.12

| OBJECT ID | ATTRIBUTE | DATE | COMMENT | URL | OBJECT ID LIST |
|---|---|---|---|---|---|
| F000001 | COMPANY | 04/04/1984 | COMPANY NAME: A INDUSTRY ADDRESS: ...DAIMON KADOMA, KADOMA-SHI, OSAKA TELEPHONE NUMBER: 06-6908.... | http://www.abc.co.jp/sss.htm | F000102 F025698 F256987 F056324 |
| ... | ... | ... | ... | ... | ... |

| HISTORY DATA ID | HISTORY THUMBNAIL IMAGE | OBJECT ID | DATE AND TIME |
|---|---|---|---|
| A01 | a01.jpeg | F000001 | 11/11/2002 13:03 |
| ... | ... | ... | ... |

| OBJECT ID | ATTRIBUTE | DATE |
|---|---|---|
| F000001 | COMPANY | 04/04/1984 |
| F056894 | PERSONNEL | 08/07/1986 |
| F078951 | DEPARTMENT | 18/10/1983 |
| ... | ... | ... |

123

INFORMATION NAVIGATION SYSTEM

This application is a continuing application, filed under 35 U.S.C. §111(a), of International Application PCT/JP02/11992, filed Nov. 18, 2002, it being further noted that foreign priority benefit is based upon Japanese Patent Application 2001-352569, filed Nov. 19, 2001.

TECHNICAL FIELD

The present invention relates to an information navigation system, and more particularly to a system that supports browsing of data group by a user to acquire desired information from the data group that is associated mutually with a link.

BACKGROUND ART

Following ways have been used for searching information from a data group like retrieval of office document in an industry, document retrieval from an electronic library, and Web page browsing in a WWW (World Wide Web) that is linked.

a. Use of Search Engine

By using a full-text search technology that is used for text information, attributes and outline of title of data that matches with a keyword that is input by a user are listed up in an order of degree of matching and is provided to the user. The user selects data from the list that matches with his requirement and browses contents of the data.

b. Use of Category

By some way, a data group is classified according to levels in categories and the user searches information by using the category levels.

c. Use of Link

Information that matches with the user's requirement is searched by tracing a link from data that is selected by some way.

However in 'a' mentioned above, sometimes the number of search results that are provided by a search engine is enormous and the order in which the search results are provided does not match with the user's requirement. In such case, it is difficult for the user to get the desired information. Sometimes, sufficient information cannot be obtained by browsing a single data. In such case, it is difficult to judge an order in which a plurality of data that is listed up is to be browsed. Sometimes, data that has to be browsed may not be even listed up.

In 'b' mentioned above, when the classification in categories does not match with the user's requirement, it is difficult for the user to get the desired information. Moreover, similarly as in 'a' mentioned above, when sufficient information cannot be obtained by browsing a single data, it causes a problem.

In 'c' mentioned above, when the link is not proper, there is a possibility of browsing unnecessary data. Moreover, while tracing the link, the search may go astray due to inability to return to an original data etc.

To obtain the desired information efficiently from the data group that is linked mutually, it is desirable to start from suitable data and go on browsing related data in a suitable order. When a wrong order is followed, it is desirable to return to the original data or to data that is browsed earlier. For this, it is necessary to solve the following issues (problems) (1) to (4).

(1) How to decide from which data to start?

(2) How to decide as to which data has to be browsed next?

(3) How to identify position of data that is browsed or data that is being browsed in the overall data that has to be browsed.

(4) How to visualize efficiently, a link relationship between data.

Therefore, an object of the present invention is to provide an information navigation system in which these issues are solved.

DISCLOSURE OF THE INVENTION

It is an object of the present invention to at least solve the problems in the conventional technology.

An information navigation system according to one aspect of the present invention is for supporting browsing of data which are linked mutually. The information navigation system includes an starting point determination supporter that supports detection of first data being a starting point for an information navigation; a browsing supporter that displays the first data and second data linked to the first data as in a virtual space, to allow a user to select data to be browsed next; and a positioning supporter that displays a current browsing position on a map which indicates a relation between all data.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 5 is an illustration of a group classification display of the starting point candidate documents in which the group classification is displayed as lists;

FIG. 6 is an illustration of a visualized display of the group classification of the starting point candidate documents;

FIG. 12 is a diagram expressing a tabular structure of a link database 121 stored in a storage 120 shown in FIG. 11;

FIG. 13 is a diagram expressing a tabular structure of a history database 122 stored in the storage 120 shown in FIG. 11;

FIG. 14 is a diagram expressing a tabular structure of a positioning database 123 stored in the storage 120;

BEST MODE FOR CARRYING OUT THE INVENTION

A first and a second embodiment of the present invention are described below with reference to diagrams.

Figure 1:
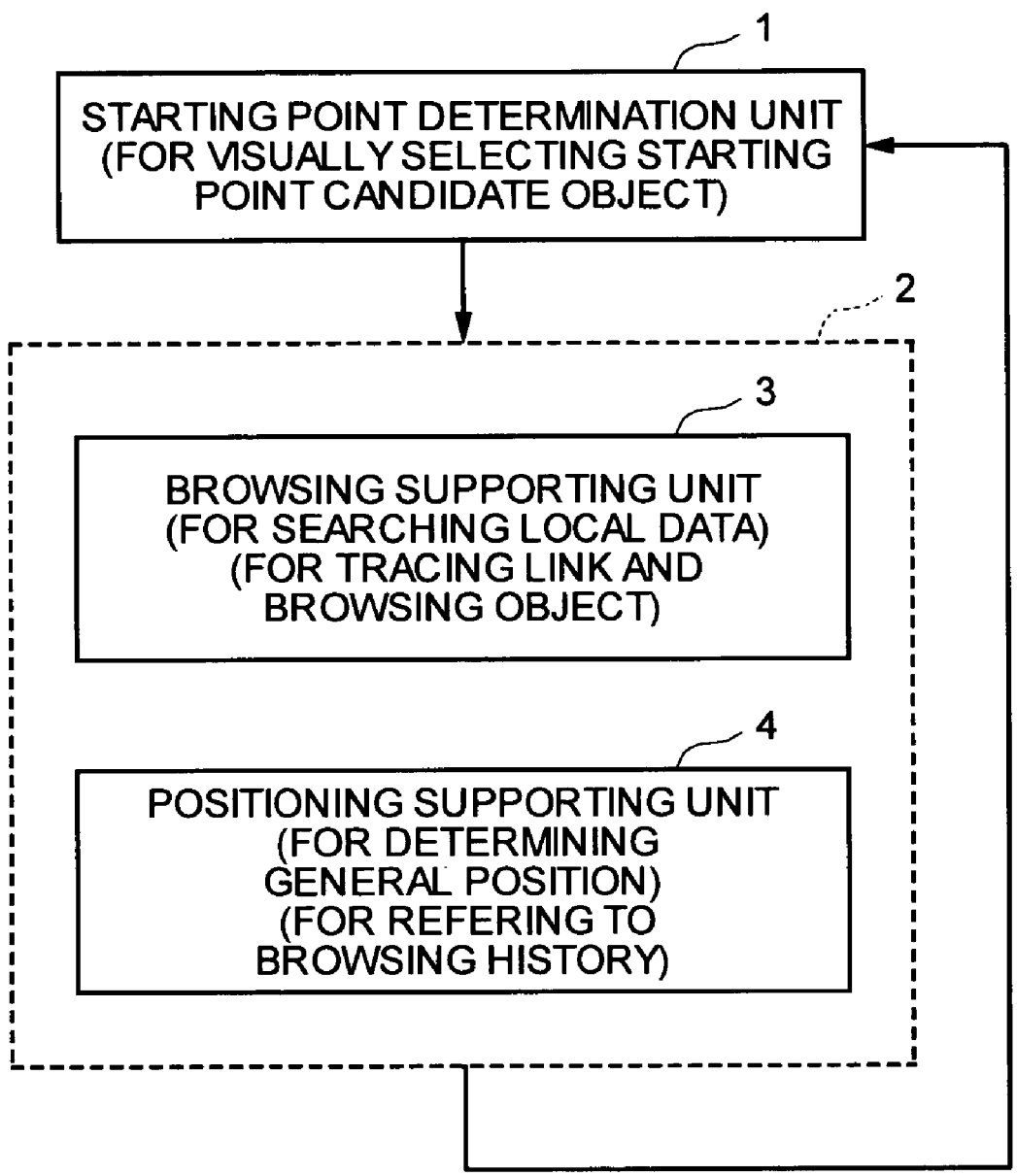
FIG. 1 is a diagram of a principle of a present invention.
Figure 2:
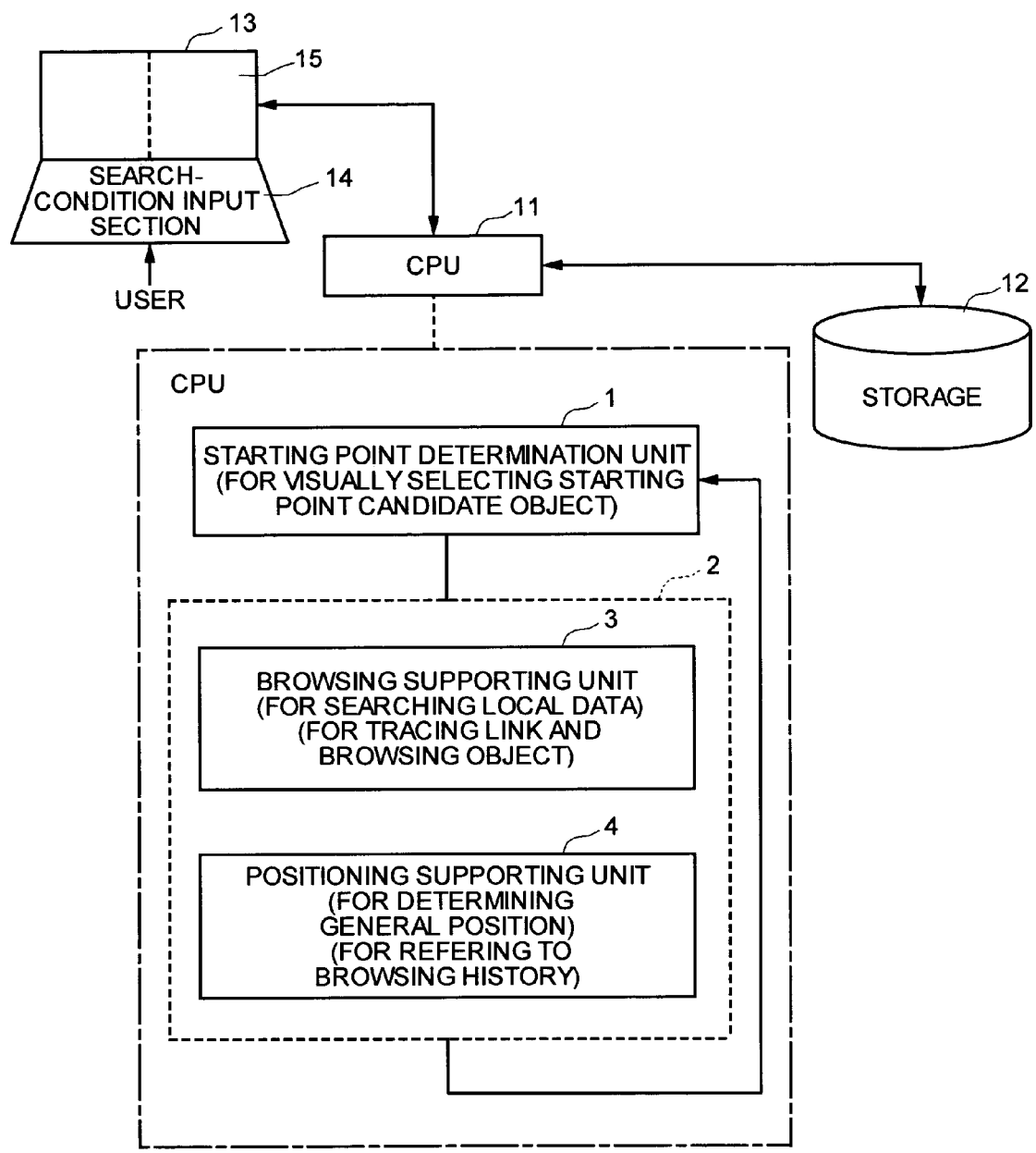
FIG. 2 is a diagram expressing a first embodiment of the present invention.
Figure 3:
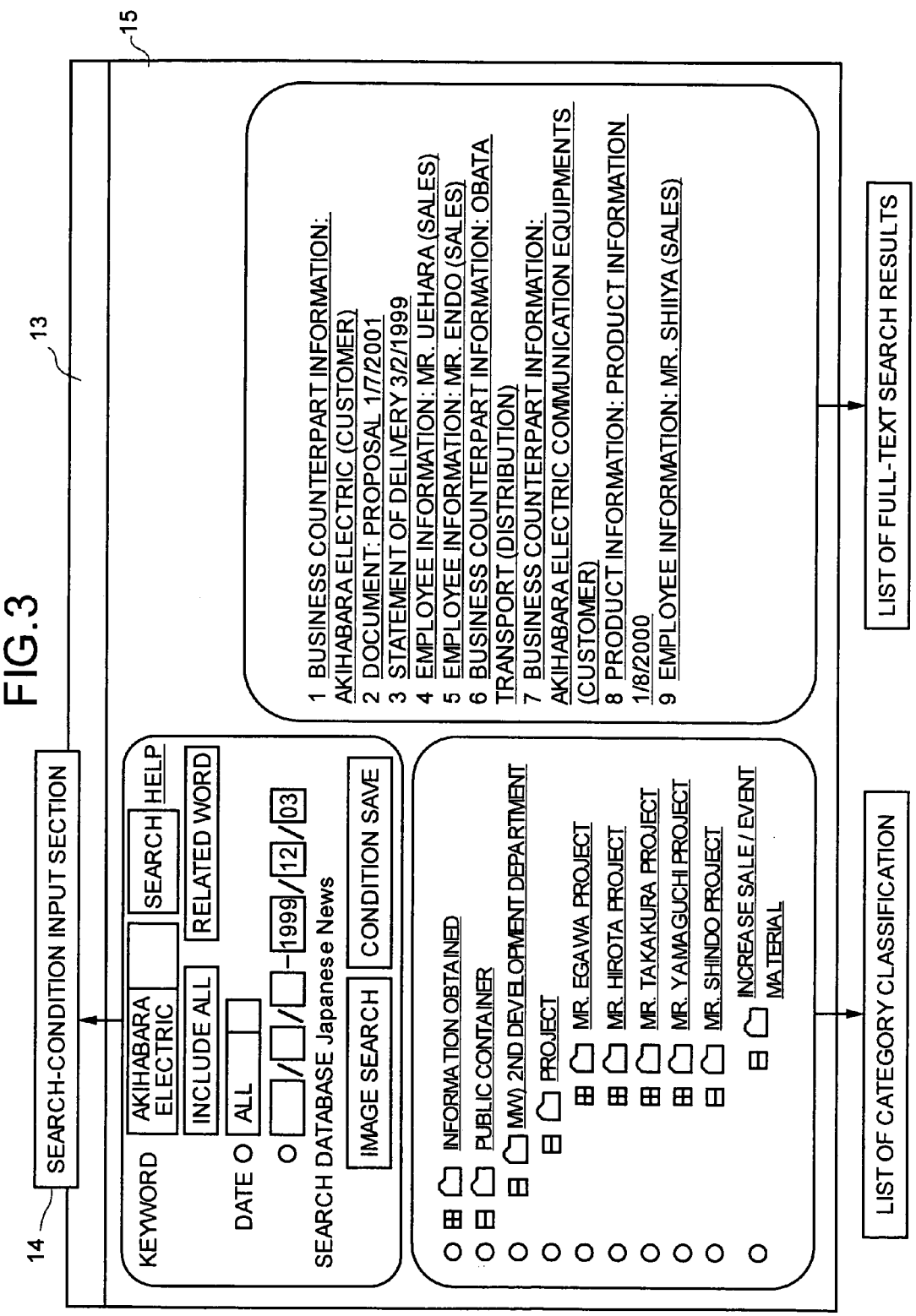
FIG. 3 is diagram expressing a user interface of an starting point determination unit.
Figure 4:
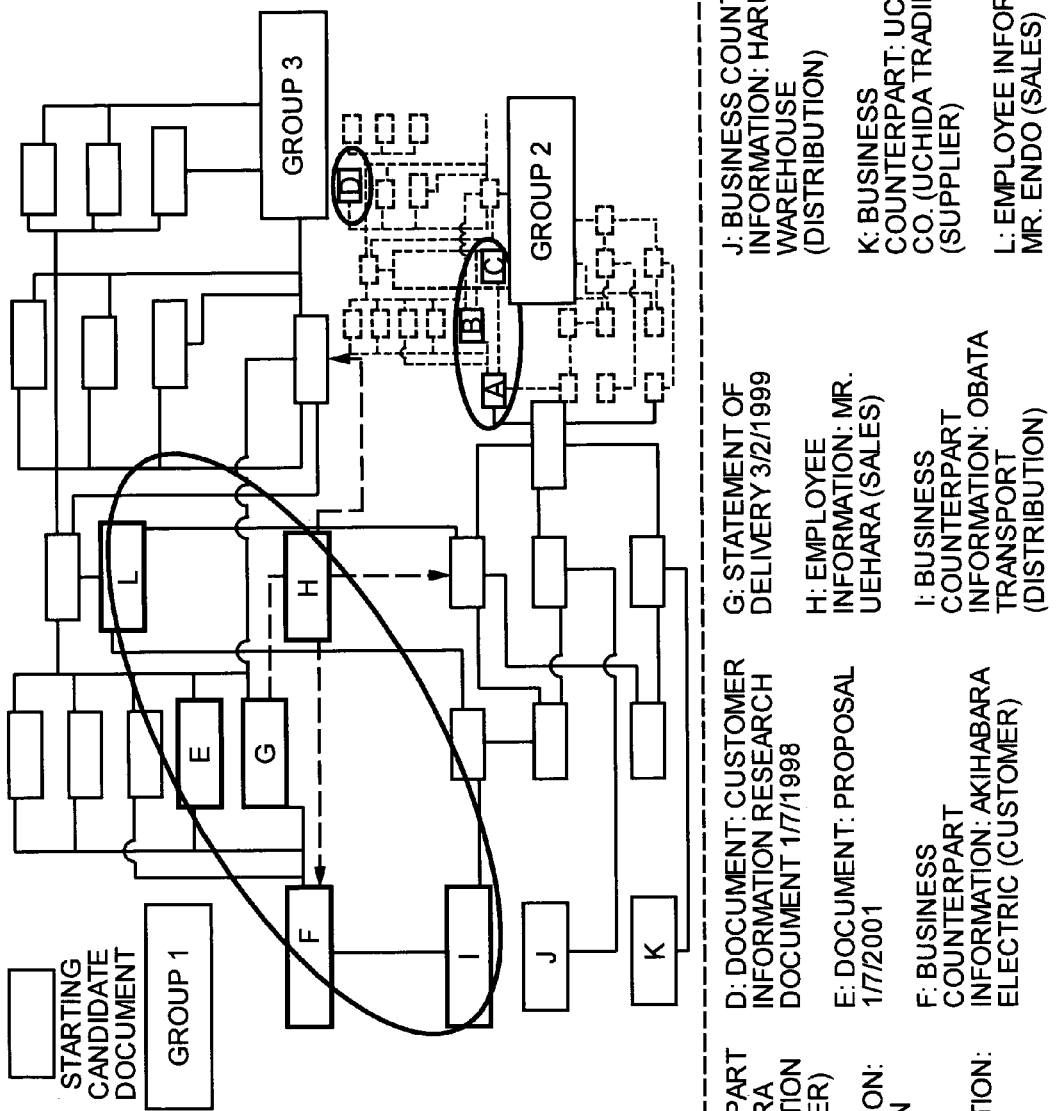
FIG. 4 is an illustration of grouping of starting point candidate documents in which a link relationship is used.
Figure 7:
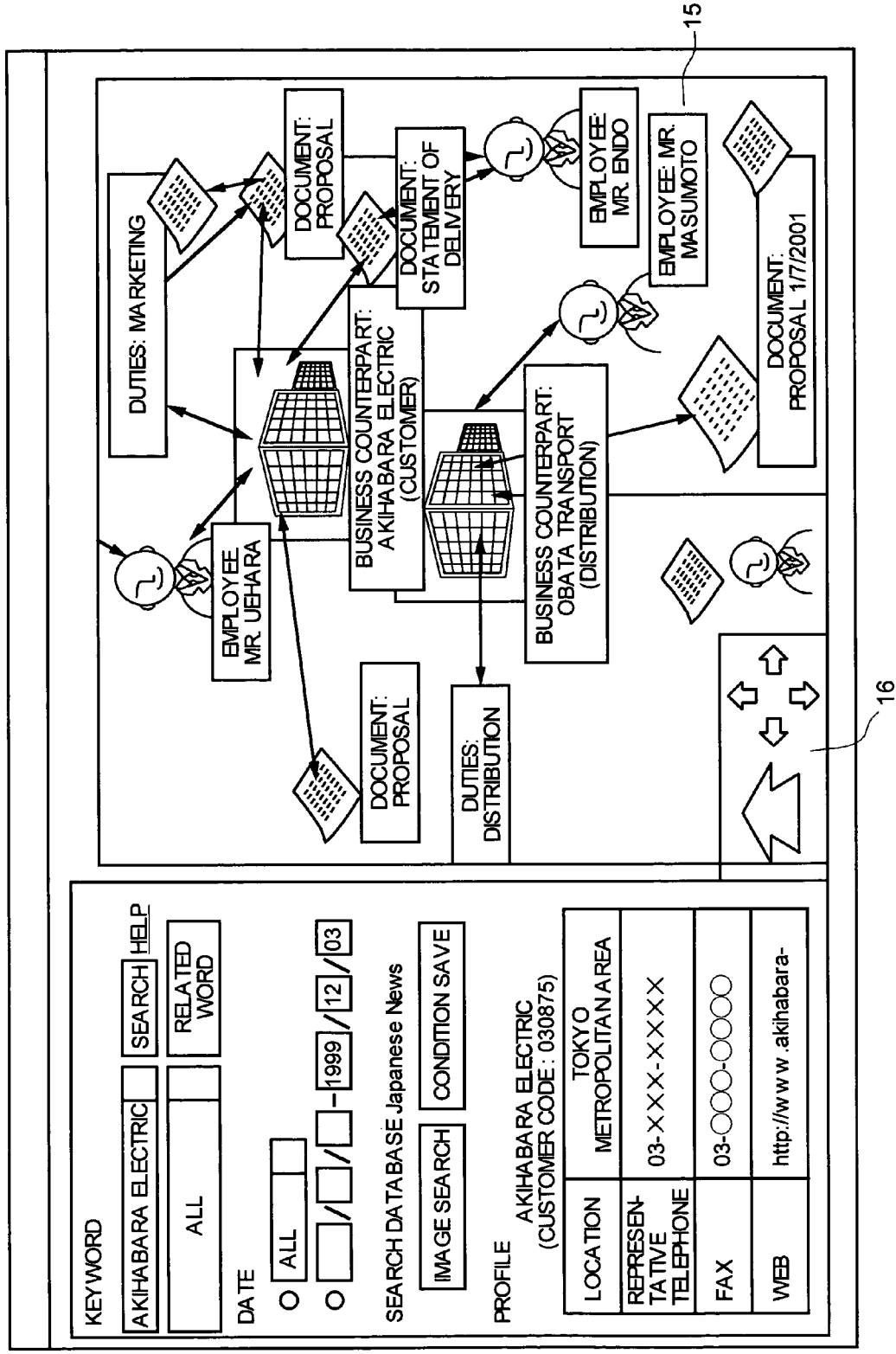
FIG. 7 is an illustration of a user interface (1) of a browsing supporting unit.
Figure 8:
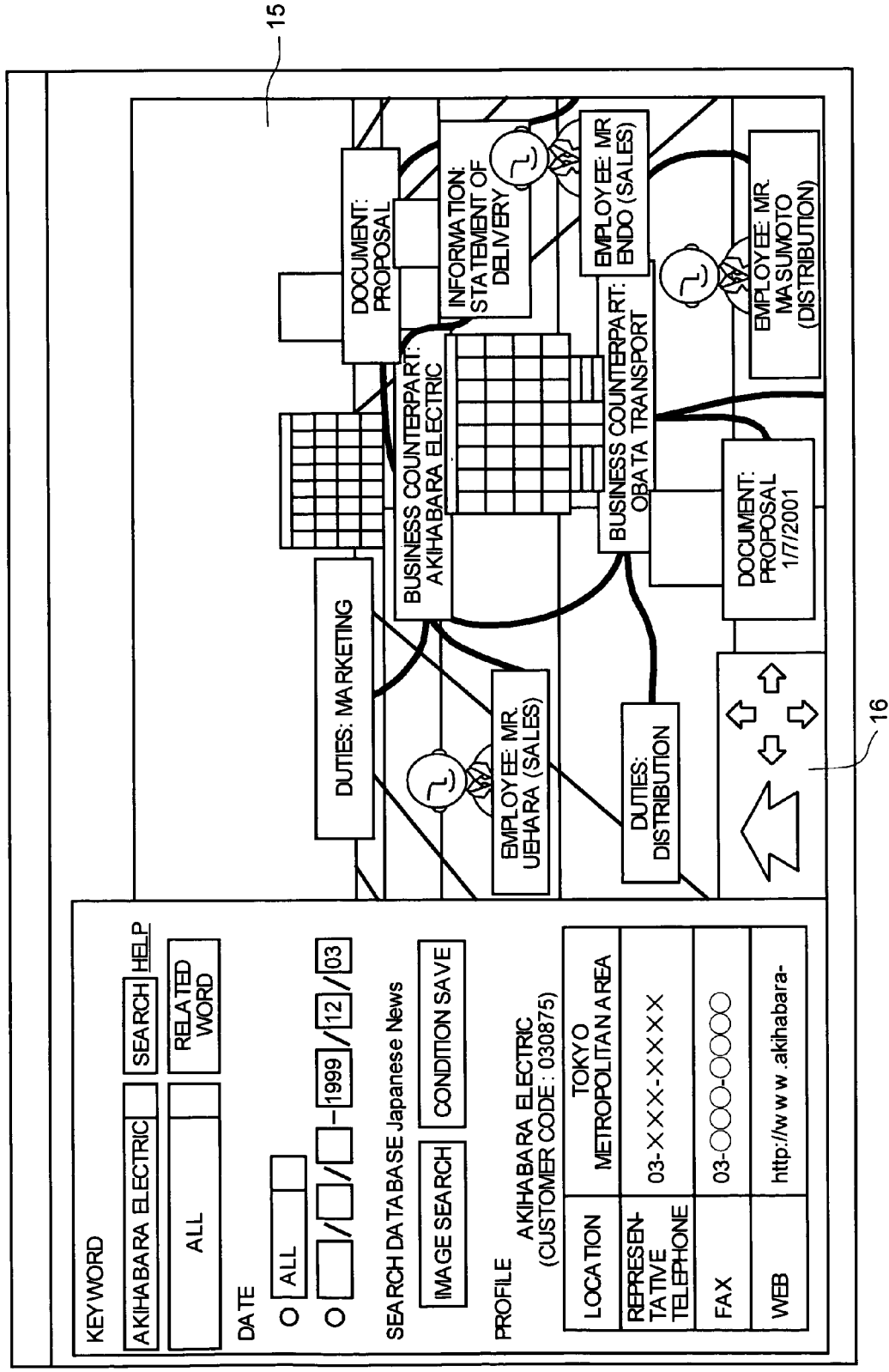
FIG. 8 is an illustration of a user interface (2) of the browsing supporting unit.
Figure 9:
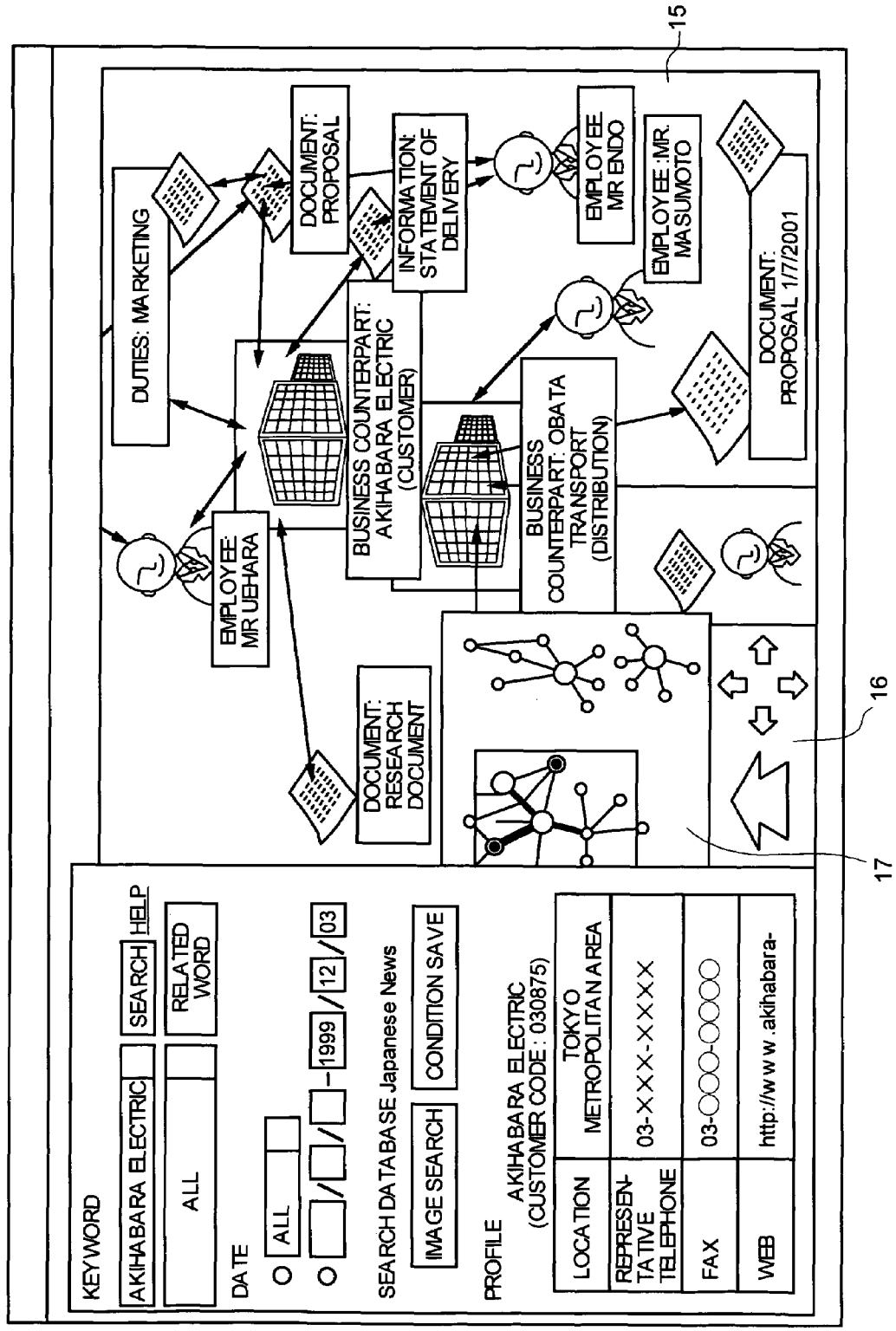
FIG. 9 is an illustration of a user interface (1) of a positioning supporting unit.
Figure 10:
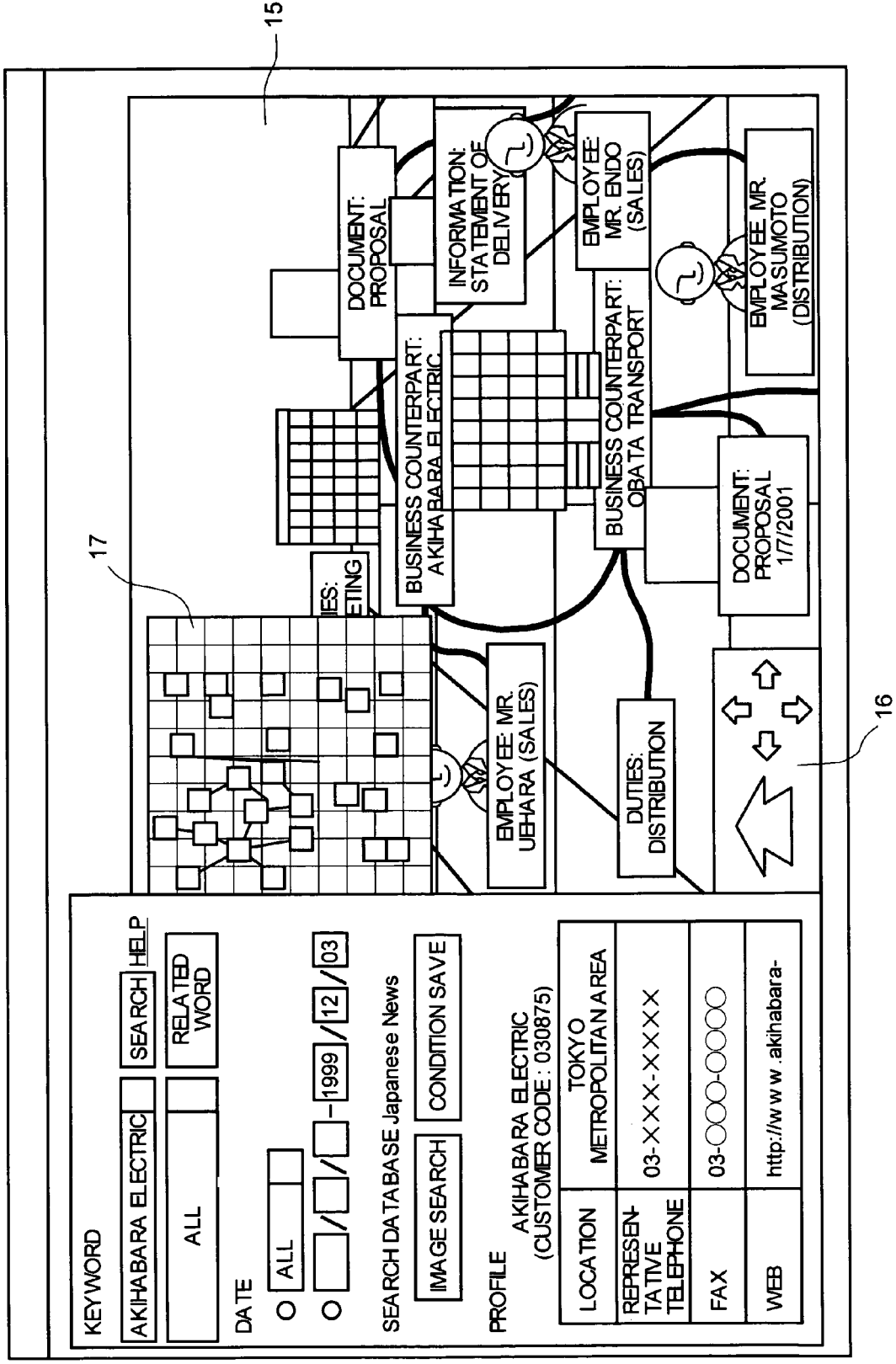
FIG. 10 is an illustration of a user interface (2) of the positioning supporting unit.

A first embodiment of the present invention is described based on FIG. 2 to FIG. 10. FIG. 2 is a diagram of the first embodiment of the present invention. FIG. 3 is a diagram indicating a user interface of an starting point determination unit. FIG. 4 is an illustration of grouping of starting point candidate documents in which a link relationship is used. FIG. 5 is an illustration of a group classification display of the starting point candidate documents in which the group classification is displayed as lists. FIG. 6 is an illustration of a visualized display of the group classification of the starting point candidate documents. FIG. 7 is an illustration of a user interface (1) of a browsing supporting unit. FIG. 8 is an illustration of a user interface (2) of the browsing supporting unit. FIG. 9 is an illustration of a user interface (1) of a positioning supporting unit. FIG. 10 is an illustration of a user interface (2) of the positioning supporting unit.

In the diagram, the same reference numerals indicate the same sections. 1 denotes an starting point determination unit, 2 denotes a supporting unit, 3 denotes a browsing supporting unit, 4 denotes a positioning supporting unit, 11 denotes a CPU (Central Processing Unit), 12 denotes a storage, 13 denotes a terminal device, 14 denotes a search-condition input section, and 15 denotes a search-result display section.

The starting point determination unit 1 provides to a user, data that is candidates for an starting point from where information navigation starts, and supports operation of selecting the starting point from the data. For this, there is a technique in which documents are classified according to category in advance and from these documents, the user selects a document that becomes an starting point. In another technique, by using a search engine that uses a full-text search technology, the user limits starting point candidate documents by inputting a keyword and selects a document that becomes the starting point. A LIST OF CATEGORY CLASSIFICATION on a left side bottom in FIG. 3 indicates the former method and a LIST OF FULL-TEXT SEARCH RESULTS on a right side indicates an starting point candidate according to the technique using the search engine.

In FIG. 3, in the former case, MR. EGAWA PROJECT, MR. HIROTA PROJECT, MR. TAKAKURA PROJECT, MR. YAMAGUCHI PROJECT, MR. SHINDO PROJECT are documents related to projects of an MW) 2ND DEVELOPMENT DEPARTMENT. Search is performed by selecting a desired category.

In the latter case, as a search condition, as indicated on left side bottom in FIG. 3, when the full-text search is performed with a keyword AKIHABARA ELECTRIC, as shown on the right side, BUSINESS: COUNTERPART INFORMATION: AKIHABARA ELECTRIC (CUSTOMER), DOCUMENT: PROPOSAL Jan. 7, 2001, STATEMENT OF DELIVERY Mar. 2, 1999, EMPLOYEE INFORMATION: MR. UEHARA (SALES), EMPLOYEE INFORMATION: MR. ENDO (SALES), BUSINESS COUNTERPART INFORMATION: OBATA TRANSPORT (DISTRIBUTION), BUSINESS COUNTERPART INFORMATION: AKIHABARA ELECTRIC COMMUNICATION EQUIPMENTS (CUSTOMER), PRODUCT INFORMATION: PRODUCT INFORMATION Jan. 8, 2000, and EMPLOYEE INFORMATION: MR. SHIIYA (SALES) are indicated.

Thus, when there is a possibility that a multiple number of starting point candidate documents may be listed up, as shown in FIG. 4, the documents are classified in a plurality of groups so that the documents for which the link (relationship) between the documents is strong are grouped in a same group. In other words, as shown in FIG. 3, from 1. BUSINESS COUNTERPART INFORMATION: AKIHABARA ELECTRIC (CUSTOMER) to 6. BUSINESS COUNTERPART INFORMATION: OBATA TRANSPORT (DISTRIBUTION), are classified as group 1. From 7. BUSINESS COUNTERPART INFORMATION: AKIHABARA ELECTRIC COMMUNICATION EQUIPMENTS (CUSTOMER) to 9. EMPLOYEE INFORMATION: MR. SHIIYA (SALES) are classified as group 2. DOCUMENT: CUSTOMER INFORMATION RESEARCH DOCUMENT Jan. 7, 1998 that is not displayed in FIG. 3 is classified as group 3. Further, as shown on right side in FIG. 5, it is provided to the user, thereby allowing to select suitably a document that becomes the starting point. Instead of displaying a list of the group classification of the starting point candidate documents as shown in FIG. 5, as shown in FIG. 6, as it is displayed in the search-result display section on a right side of a display, hit data is popped, and label and link are displayed. Further, the data is expressed as nodes, and color is changed according to classification of the data. An arrangement can be made so that the user can specify how many links are to be traced from the hit data.

The supporting unit 2, during information search by the user, supports selecting data that has to be browsed next by the user, supports finding where in a data group the user is browsing, and includes a browsing supporting unit 3 and a positioning supporting unit 4.

The browsing supporting unit 3, for supporting selection of a document that is to be browsed next by the user, displays in a virtual space, data that is attainable by tracing few links (for example two to three links) from the document. In other words, the browsing supporting unit 3 displays the data on the search-result display section 15.

In a case of displaying the data on the search-result display section 15, as shown in FIG. 7, icons that indicate attribute or content of the data like DOCUMENT: PROPOSAL, DOCUMENT: STATEMENT OF DELIVERY can be used. As shown in FIG. 8, icons that indicate attribute or content of the data can also be used. These icons are useful, as these icons can also provide link relationship in addition to indicating attributes and content of the data. Data that has to be searched next can be selected suitably based on the data displayed.

A display area of the search-result display section 15 can be zoomed and can be moved upward, downward, to left, and to right and displayed by a navigator 16. If the zooming is the maximum, a global map 17 that is mentioned latter can be displayed instead of displaying in a different frame.

The position supporting unit 4 displays an overall data group as a map that indicates mutual relationship, i.e. as a current position on the global map 17 for the user to know as to where in the data group, the user is browsing.

As a display of the global map 17, as shown in FIG. 9, the global map 17 is displayed, content that is displayed on the search-result display section 15 is encircled in a frame, and the current position, what is being looked at currently, is displayed by node colors to enable to distinguish. The link that is traced is displayed by a specific color so that it can be distinguished. By doing so, the current position, a position of data searched, a link that is already traced etc. can be shown to the user. The user, by having a look at this, can easily return to the original data or to data that was browsed previously, thereby preventing the user from going astray while browsing.

Another display technique of the global map 17, as shown in FIG. 10, is to display the data in a form of a map together with the link, to show by colors of blocks the current position, what is being looked at currently, to be able to distinguish, and to display the link that is traced by a specific color so that it can be distinguished. By doing so, the current position, the position of the data that is already searched the link that is already traced can be shown to the user similarly as in FIG. 9. The user, by having a look at this, can easily return to the original data or to the data that was browsed previously, thereby preventing the user from going astray while browsing.

The CPU 11 operates the starting point determination unit 1, the browsing supporting unit 3, and the positioning supporting unit 4 in the information navigation system according to the present invention. When this system is built over the Internet, the CPU is installed at a server's end.

The storage 12 stores documents that form the information navigation.

The terminal device 13 inputs required data when the user uses the information navigation system and displays display data shown in FIG. 3, and FIG. 5 to FIG. 10 for an interface with the user, which is transmitted from the CPU 11 to the search-result display section 15. The terminal device 13 is an information terminal like a personal computer and includes the search-condition input section 14, the search-result display section 15 etc.

The search-condition input section 14 is for inputting data, for example, in a case of a full-text search information navigation system, for inputting a keyword, for inputting data that is selected from data that is displayed on the search-result display section 15.

The search-result display section 15 displays a full-text search result that is obtained by inputting the keyword by the user for identifying the starting point and displays browsing support that is displayed in continuation with the full-text search result.

The search-result display section 15 displays the list of full-text search results as shown in FIG. 3, a group classification of the starting point candidate documents in the form of a list as shown in FIG. 5, pops up the hit data and displays labels and links as shown in FIG. 6, can express the data as nodes and displays by changing colors according to the type of data. An arrangement can be made so that the user can specify as to how many links are to be traced from the hit data. The user can select in advance the type of display shown in FIG. 5 or FIG. 6 from the display in FIG. 3, by indicating after the display in FIG. 3.

The navigator 16, as mentioned earlier, zooms in the display area of the search-result display section 15, moves upward, downward, to left, and to right and displays. If the zooming is made to be the maximum, the global map can be displayed instead of displaying in a different frame.

The global map 17, as mentioned earlier, displays as to where the data group is currently and as to where in the data group, the user is browsing, and displays the history of the data.

The global map 17 displays, as shown in FIG. 9, the global map 17, encircles content displayed on the search-result display section 15, and displays the current position and as to what is being looked at currently by node colors to enable to distinguish. The global map 17 displays the link that is traced by a specific color so that it can be distinguished. By doing so, the current position, the position of data searched, the link that is already traced etc. can be shown to the user. The user, by having a look at this, can easily return to the original data or to the data that was browsed previously, thereby preventing the user from going astray while browsing.

Another display technique of the global map 17, as shown in FIG. 10, is to display the data in the form of the map together with the link, to show by colors of blocks the current position, what is being looked at currently, to be able to distinguish, and to display the link that is traced by a specific color so that it can be distinguished. By doing so, the current position, the position of the data that is already searched, the link that is already traced can be shown to the user similarly as in FIG. 9. The user, by having a look at this, can easily return to the original data or to the data that is browsed previously, thereby preventing the user from going astray while browsing.

An operation according the present invention, in a case of technique in which the starting point determination unit uses a search engine is described below briefly.

(1) The user, inputs in advance by keys from the search-condition input section 14, for example selecting the information navigation system according to the present invention that uses the full-text search. Further, the user inputs a keyword, for example AKIHABARA ELECTRIC by using the search-condition input section 14.

(2) This is identified by the starting point determination unit 1 of the CPU 11. Each document stored in the storage 12 is subjected to full-text search by the search engine which is omitted in the diagram and as shown in FIG. 3 a document that becomes the starting point is selected. While selecting, as shown in FIG. 4 since the documents are classified in groups so that the documents for which the link between the documents is strong are in the same group, as shown in FIG. 5 the documents are classified in groups and are presented. Further, as shown in FIG. 6 or FIG. 7 the documents are linked and displayed.

(3) The user selects the required document from the plurality of documents. Due to this, the document selected from the storage 12 is read and displayed on the search-result display section 15. If the document is not the documents desired by the user, the user returns to a screen in FIG. 6 or FIG. 7, refers to the link, and selects the next document. Thus, the desired document can be obtained efficiently.

(4) However, while the selection operation is being repeated, the user forgets the documents that had been selected. As a result, the user goes on browsing the same documents repeatedly and is unable to return to the original condition, thereby going astray during browsing. In such case, the user inputs positioning supporting data from the search-condition input section 14. For example, the user touches a specific key and clicks a specific area of the search-result display section 15.

(5) Due to this, the positioning supporting unit 4 is operated and as shown in FIG. 9 or FIG. 10, the global map 17 is displayed. From the display, the user understands search condition, performs a suitable selection control, and can return to the original condition, thereby recovering from the condition of going astray.

(6) If the user cannot obtain the desired document even by following this, the user returns to the beginning, inputs the keyword newly and starts selection from the beginning.

Thus, according to the present invention, the desired information can be acquired efficiently from the data group that is mutually linked. Concretely, identification of the starting point for deciding from which data the browsing is to be started is supported and browsing support for deciding as to which data has to be browsed next is realized. Due to this, it is possible to start from the suitable data and related data can be browsed in a suitable order.

Moreover, due to realization of positioning support for knowing as to where the data that was browsed or the data that is being browsed is positioned in the overall data that has to be browsed, it is easy to return to the original data or to the data that was browsed before, if the order is wrong.

Figure 11:
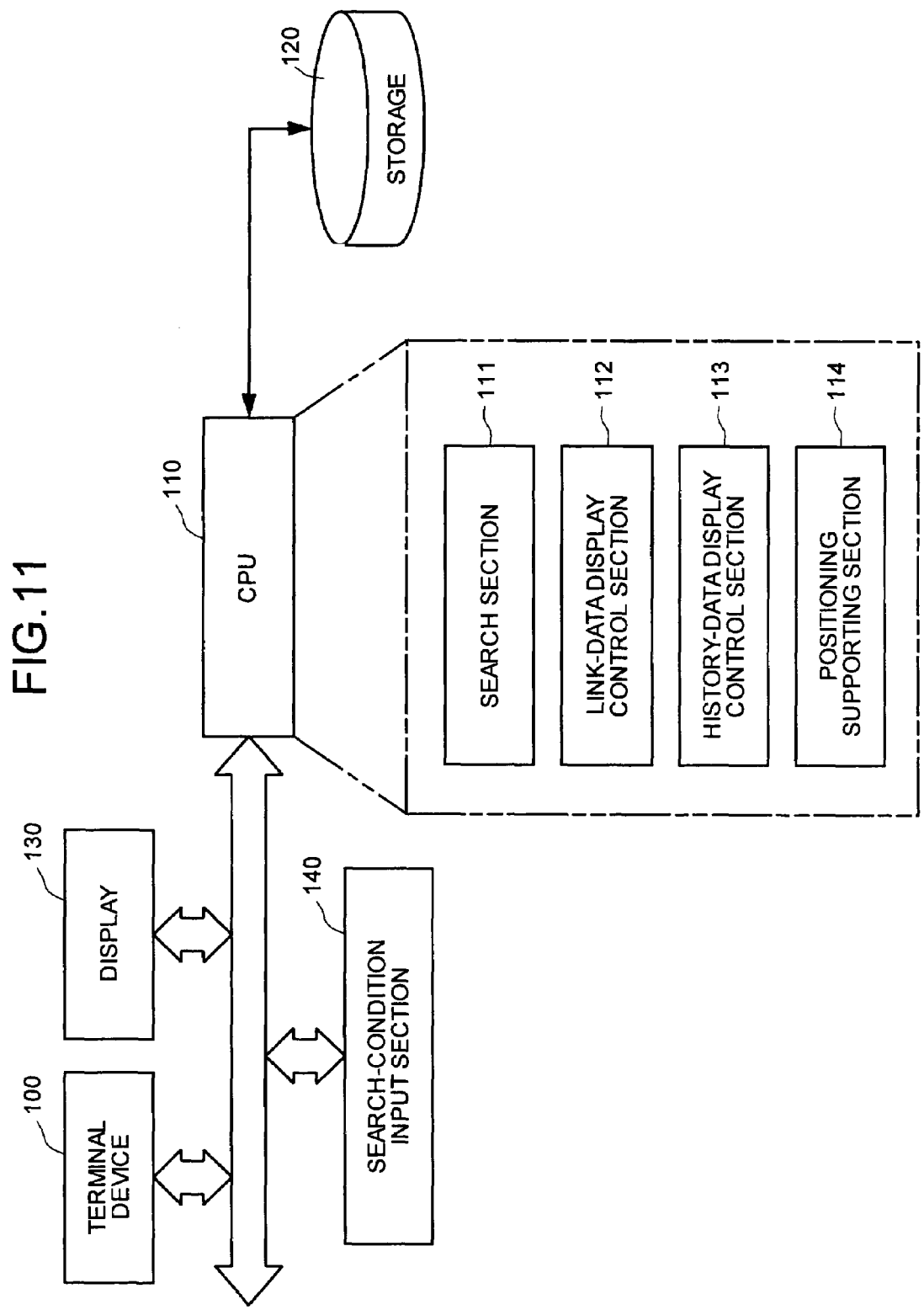
FIG. 11 is a diagram expressing a second embodiment.
Figure 15:
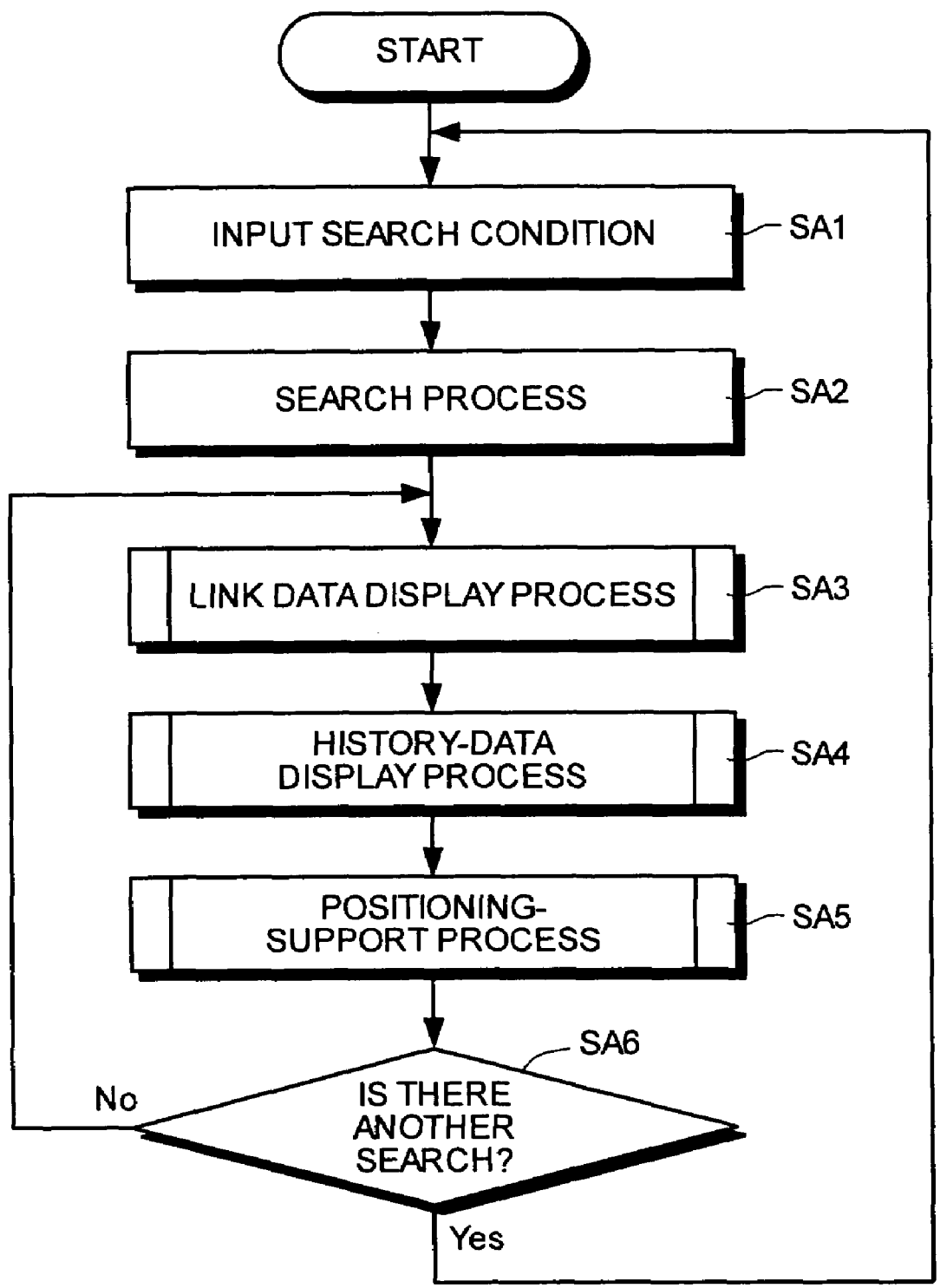
FIG. 15 is a flow chart illustrating an operation according to the second embodiment.
Figure 16:
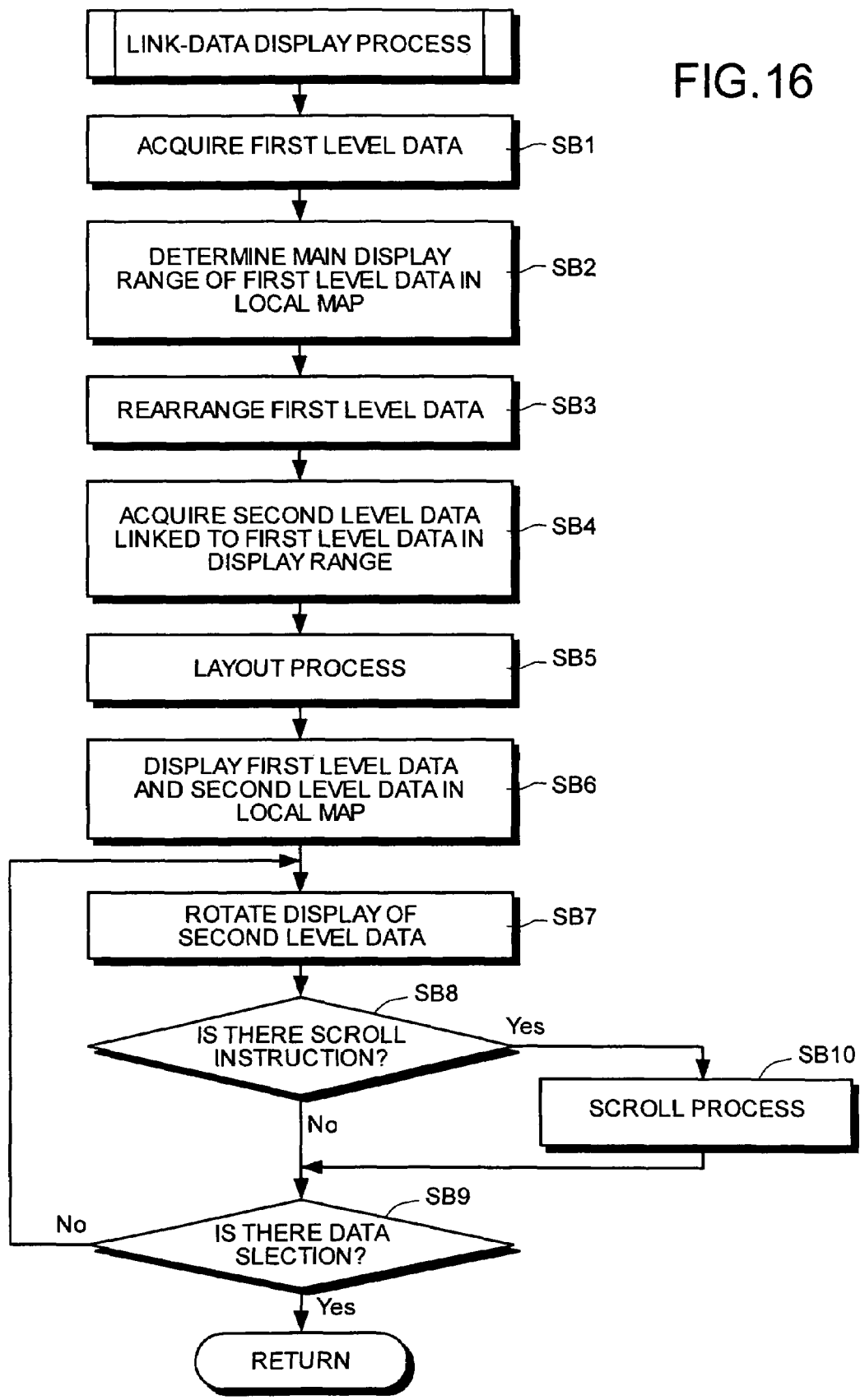
FIG. 16 is a flow chart illustrating a link-data display process shown in FIG. 15.
Figure 17:
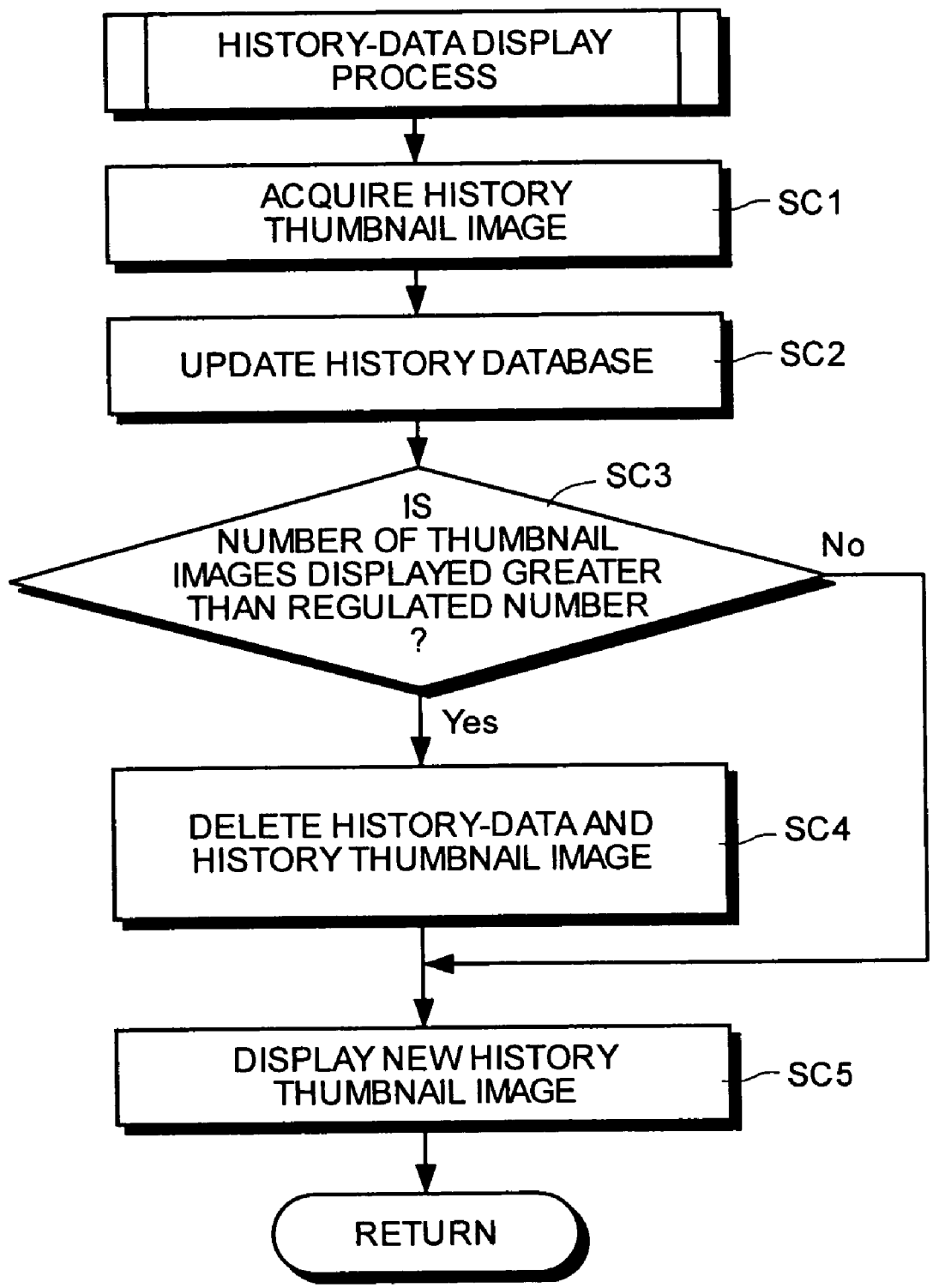
FIG. 17 is a flow chart illustrating a history-data display process shown in FIG. 15.
Figure 18:
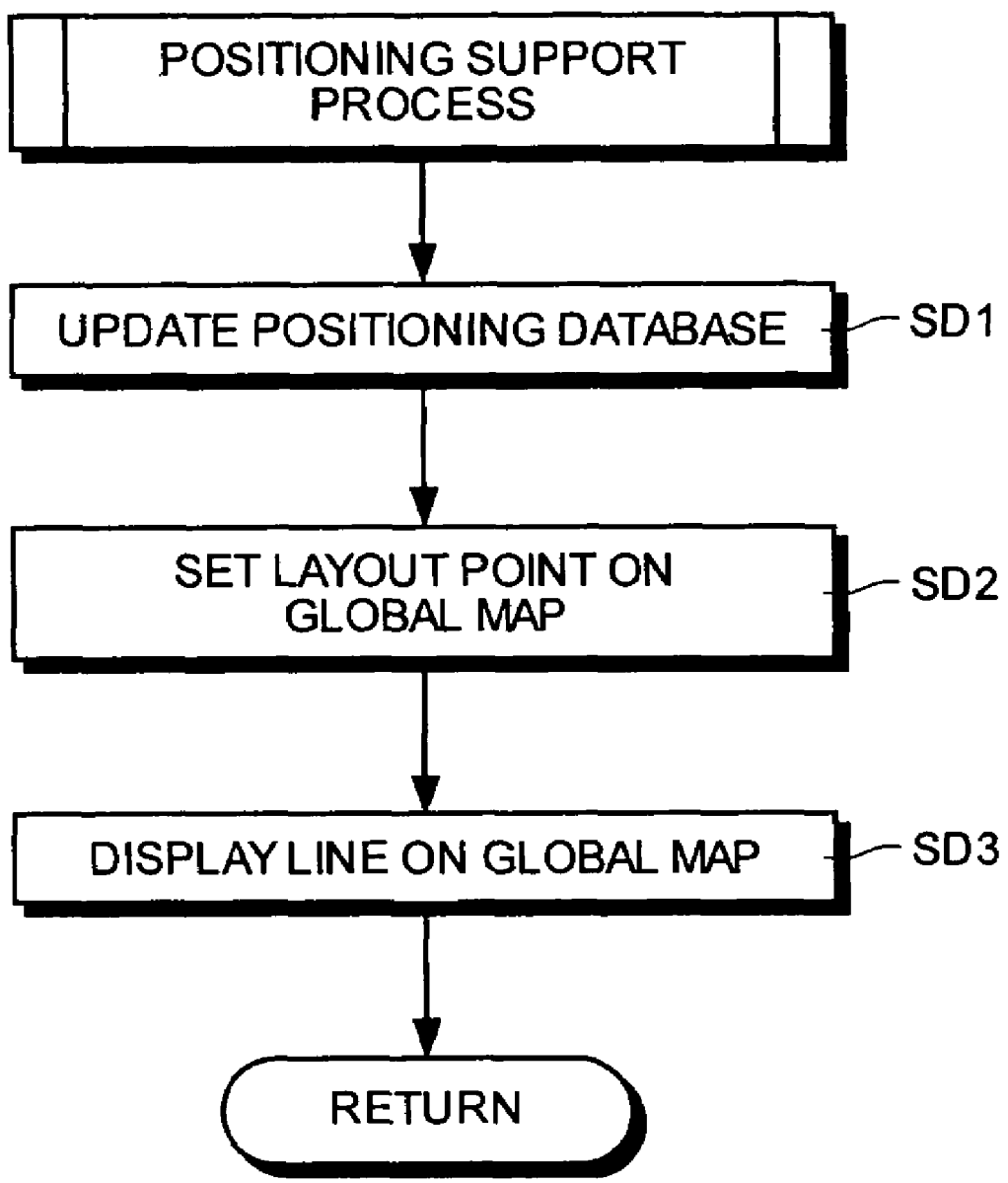
FIG. 18 is a flow chart illustrating a positioning supporting process shown in FIG. 15.
Figure 19:
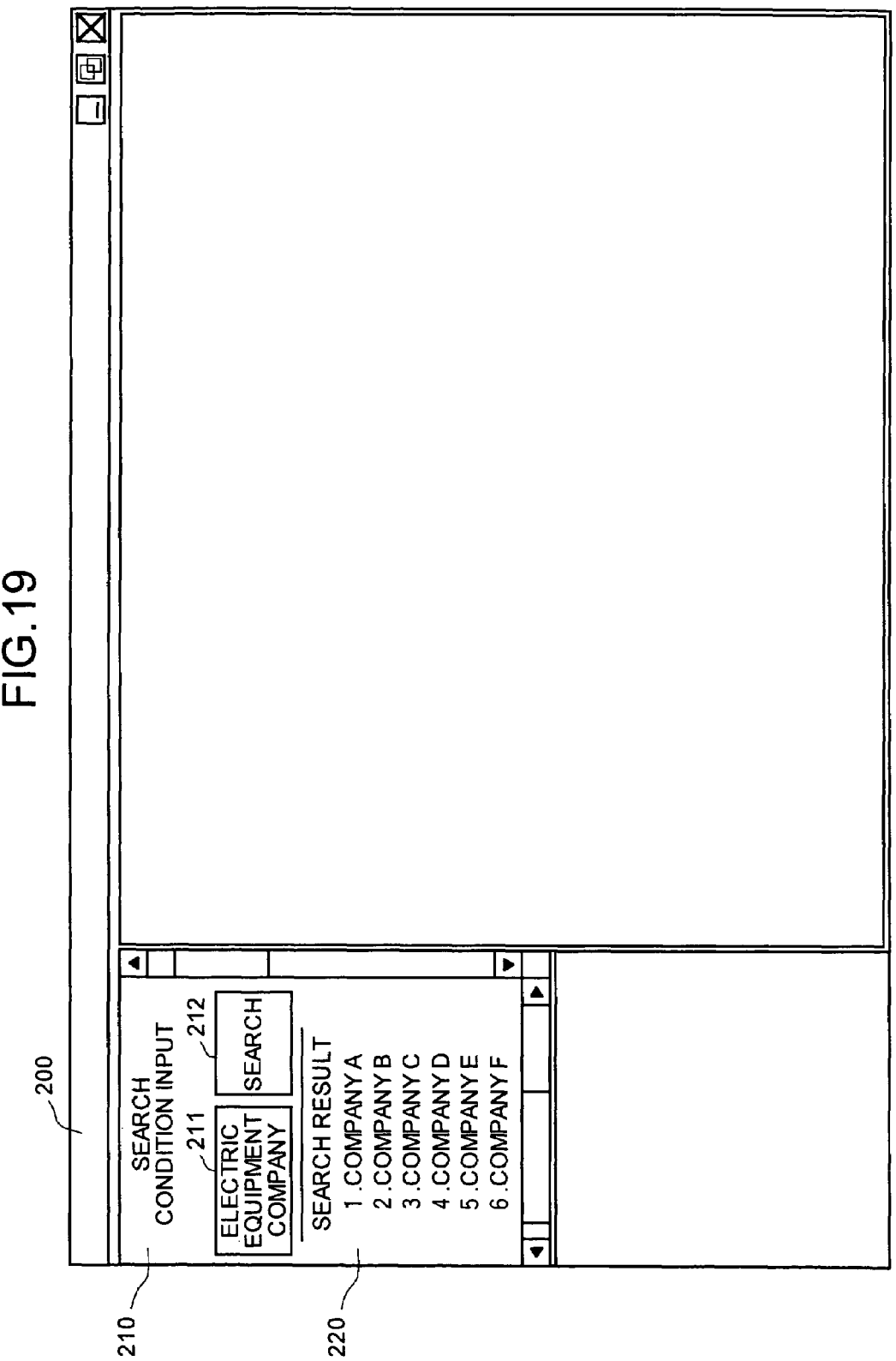
FIG. 19 is a diagram indicating an example of a display of search results according to the second embodiment.
Figure 20:
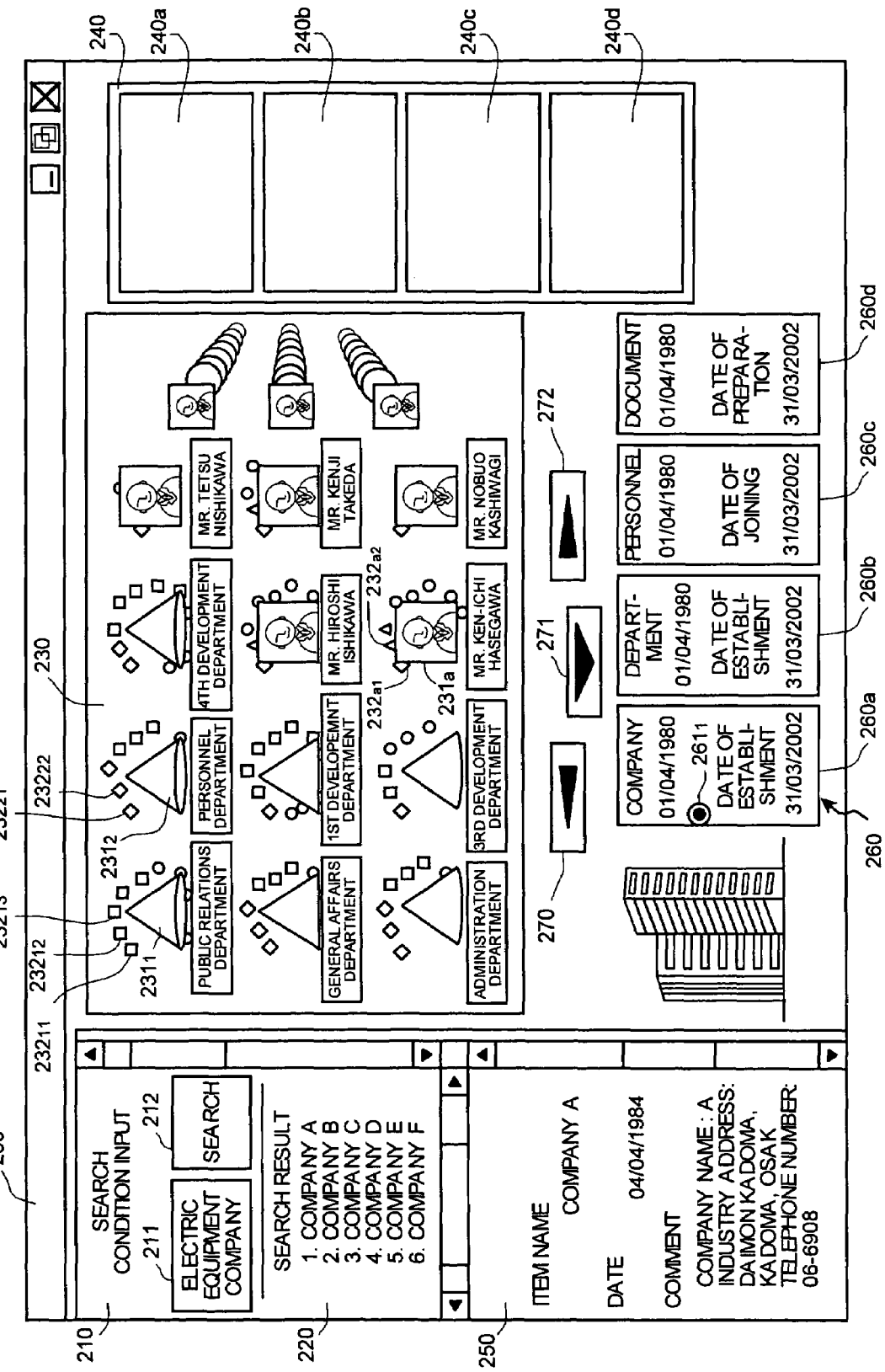
FIG. 20 is a diagram indicating an example of a display of link data etc. according to the second embodiment.
Figure 21:
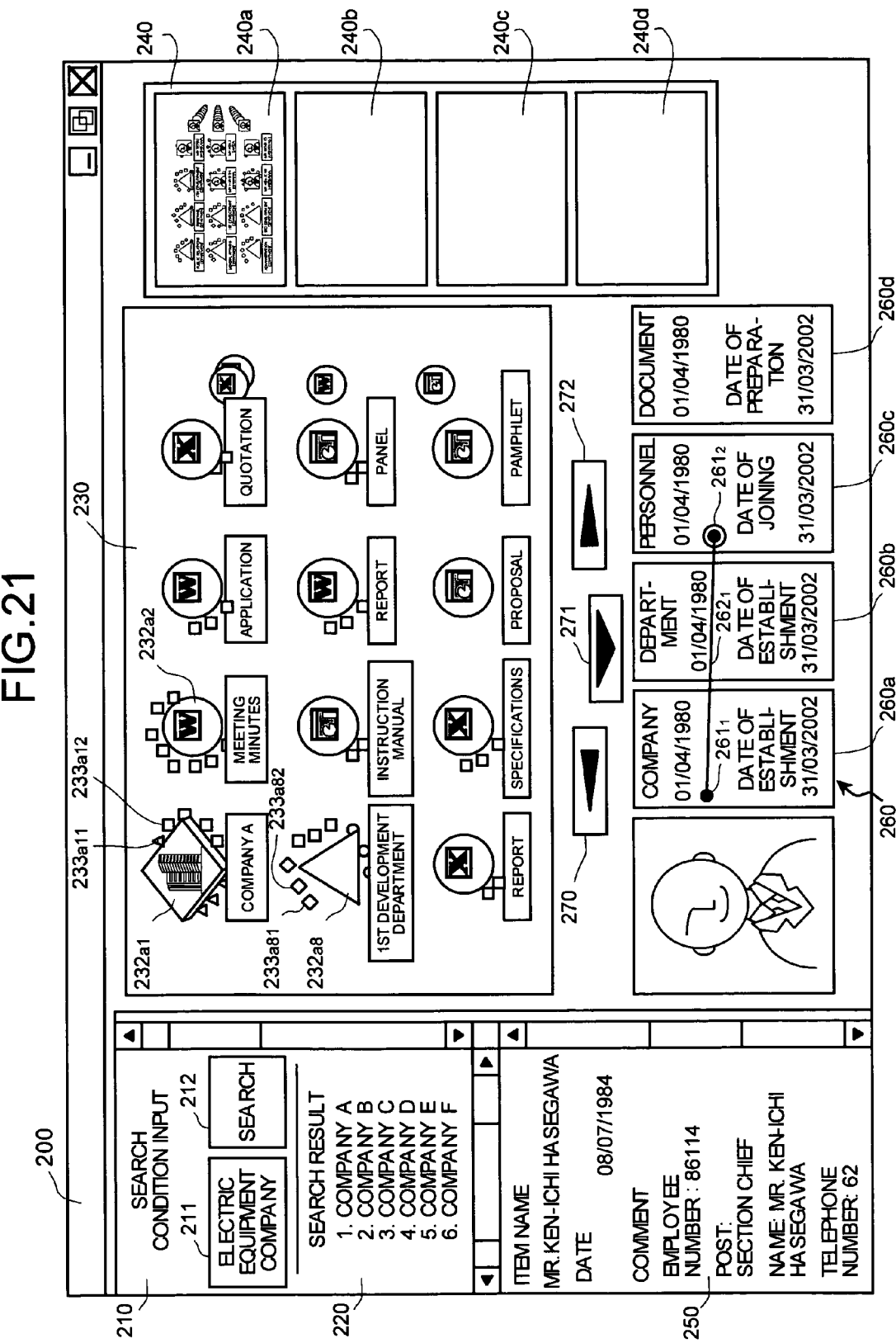
FIG. 21 is a diagram indicating an example of a display of the link data, the history data, and the positioning data etc. according to the second embodiment.
Figure 22:
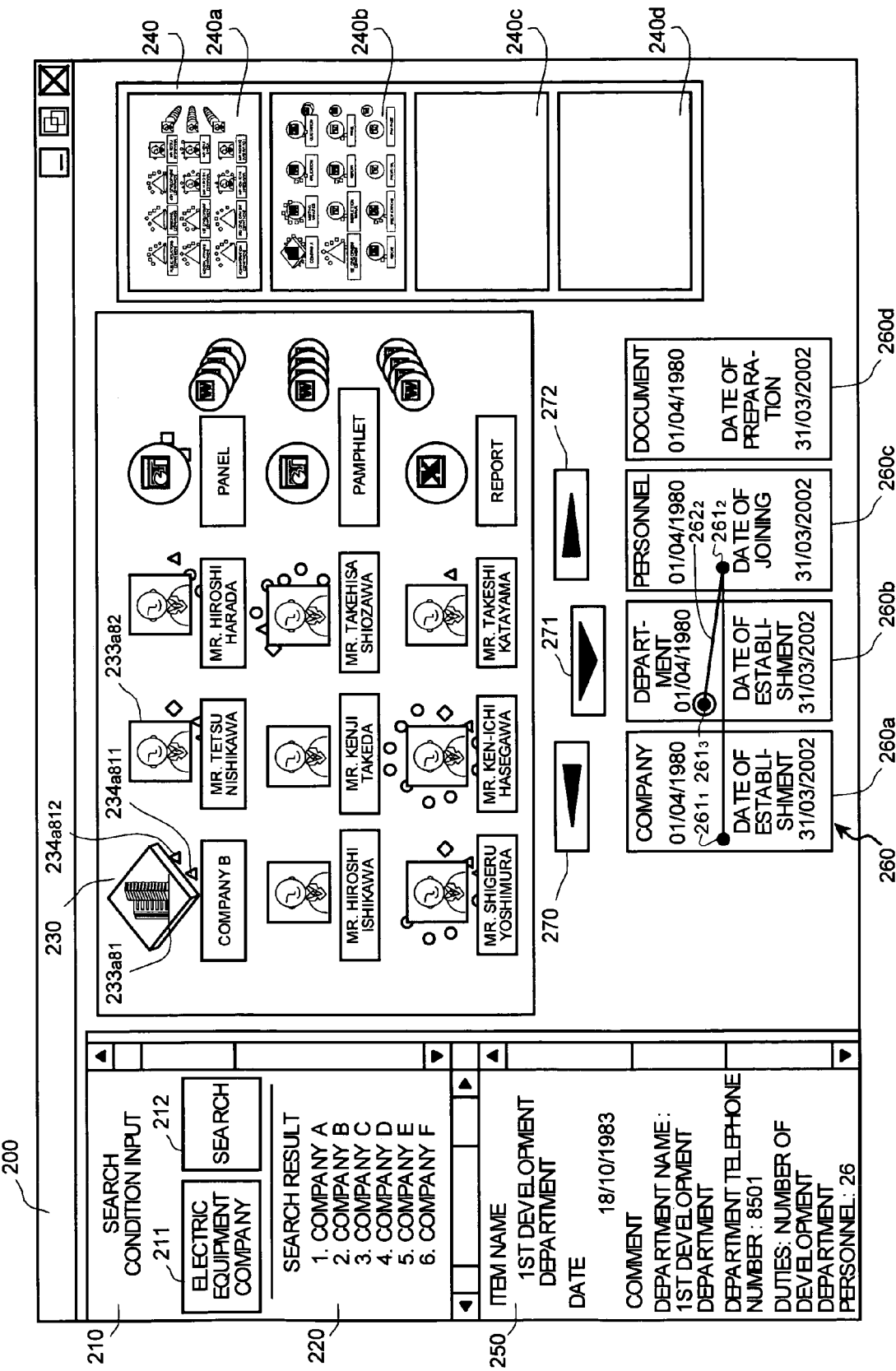
FIG. 22 is a diagram indicating an example of the link data, the history data, the positioning data etc. according to the second embodiment.

Further, a second embodiment of the present invention is described based on FIGS. 11 to 22. FIG. 11 is a diagram indicating the second embodiment. FIG. 12 is a diagram indicating a tabular structure of a link database 121 stored in a storage 120 shown in FIG. 11. FIG. 13 is a diagram indicating a tabular structure of a history database 122 stored in the storage 120 shown in FIG. 11. FIG. 14 is a diagram indicating a tabular structure of a positioning database 123 stored in the storage 120. FIG. 15 is a flow chart illustrating an operation according to the second embodiment. FIG. 16 is a flow chart illustrating a link-data display process shown in FIG. 15. FIG. 17 is a flow chart illustrating a history-data display process shown in FIG. 15. FIG. 18 is a flow chart illustrating positioning supporting process shown in FIG. 15. FIG. 19 is a diagram indicating an example of a display of search results according to the second embodiment. FIG. 20 is a diagram indicating an example of a display of link data etc. according to the second embodiment. FIG. 21 is a diagram indicating an example of a display of the link data, the history data, and the positioning data etc. according to the second embodiment. FIG. 22 is a diagram indicating an example of the link data, the history data, the positioning data etc. according to the second embodiment.

The second embodiment that is described below in detail is a modified example of the first embodiment described above and has peculiarities such as displaying efficiently the link relation of data group that is mutually linked and displaying efficiently data that was referred to during navigation when the data is referred to once again, and further is structured with an object of improving a user interface.

In an information navigation system shown in FIG. 11, 100 denotes a terminal device, 110 denotes a CPU, 111 denotes a search section, 112 denotes a link-data display control section, 113 denotes a history-data display control section, 120 denotes a storage, 130 denotes a display, and 140 denotes a search-condition input section.

The terminal device 10 inputs required data when the user uses the information navigation system and displays screens shown in FIG. 19 to FIG. 22 for interface with the user that are transmitted from the CPU 110 to the display 130. The terminal device is an information terminal like a personal computer and includes the search-condition input section 140, the display 130 etc.

The search-condition input section 140 is for inputting data, for example in a case of the full-text search information navigation system, for inputting a keyword, for inputting data that is selected from data that is displayed on the display 130.

The display 130 is for displaying the full-text search result that is obtained by inputting the keyword by the user for identifying the starting point and displaying browsing support that is displayed in continuation with the full-text search result.

The CPU 110 operates the search section 111, the link-data display control section 112, the history-data display control section 113, the positioning supporting section 114 etc. The search section 111 searches documents stored in the storage 120 by keyword search etc. The link-data display control section 112 performs control for displaying link condition of the data based on the search result in the search section 111. The history-data display control section 113 performs control for displaying history when the user traces link of the data, by thumbnail images.

The positioning supporting section 114 displays an overall data group as a map that indicates mutual relationship, i.e. as a current position on a global map for the user to know as to where in the data group the user is browsing.

The storage 120 stores data (documents, images etc.) that is included in the information navigation. Moreover, the storage 120 includes a link database 121 (refer to FIG. 12), a history database 122 (refer to FIG. 13), and a positioning database 123 (refer to FIG. 14).

The link database 121 shown in FIG. 12 stores link data that indicates link relationship in the data group and includes fields like OBJECT ID, ATTRIBUTE, DATE, COMMENT, URL, OBJECT ID LIST etc.

The OBJECT ID is an identifier for identifying the data (object). The ATTRIBUTE is an attribute of the data (for example, a company, a department, a personnel etc.), the DATE is a date on which the data is created. The COMMENT is a remark of the data. The URL (Uniform Resource Locator) indicates a location when the data is stored actually. The OBJECT ID LIST is a list of object IDs of data (second level data) that is linked to the data (first level data).

The history database 122 shown in FIG. 13 stores history data related to history in a case where the user has traced a link of the data and includes fields like HISTORY DATA ID, HISTORY THUMBNAIL IMAGE, OBJECT ID, DATE AND TIME etc.

The HISTORY DATA ID is an identifier for identifying history data. The HISTORY THUMBNAIL IMAGE is a reduced image just before the user has traced the link, the OBJECT ID is an identifier for identifying the first level data (displayed in a selection data display area 250) selected on a screen 200 corresponding to a thumbnail image and corresponds to the object ID shown in FIG. 12. The DATE AND TIME is a date and time of creation of the history data.

The positioning database 123 shown in FIG. 14 stores positioning data for supporting the user to understand as to where in the data group the user is browsing and includes the fields OBJECT ID, ATTRIBUTE, DATE etc. mentioned earlier.

Next, the operation according to the second embodiment is described with reference to flow charts shown in FIG. 15 to FIG. 18 and examples of display of screens shown in FIG. 19 to FIG. 22. At step SA1 shown in FIG. 15, the user inputs by using keys for example from the search-condition input section 140, selecting an information navigation system in which full-text search is used. Further, the user inputs a keyword, for example ELECTRIC EQUIPMENT COMPANY in a field 211 for search condition input area 210 in a search condition input area on the screen 200 shown in FIG. 19 and presses a search button 212.

At step SA2, the search section 111 of the CPU 110 performs full search of each document stored in the storage 120 by the search engine (omitted in the diagram) and displays the search result (1. COMPANY A, 2. COMPANY B, 3. COMPANY C etc.), in a search result display area 220.

The user, for example selects COMPANY A that becomes an starting point from the search result of the search result display area 220. Due to this, data corresponding to the COMPANY A is displayed on a selected data display area 250 of the screen 200 shown in FIG. 20. Moreover, the positioning supporting section 114 stores in the positioning database 123 (refer to FIG. 14) an object ID (in this case, F000001), an attribute (in this case, company), and a date (in this case, Apr. 4, 1984) related to COMPANY A selected and updates.

Further, the positioning supporting section 114 displays a layout point $261_1$ to an area 260a (company) corresponding to the attribute mentioned above (in this case, company) in a global map area 260 shown in FIG. 20.

A global map in which the mutual relationship of the overall data group is displayed for the user to know as to where the user is browsing in the data group is displayed in the global map area 260.

In the global map area 260, a horizontal direction corresponds to an attribute of the data selected by the user. Concretely, the area 260a corresponds to a company that is an attribute. An area 260b corresponds to a department that is an attribute. An area 260c corresponds to a personnel that is an attribute. An area 260d corresponds to a document that is an attribute. Moreover, a vertical direction in the global map area 260 corresponds to a time base.

According to the second embodiment, the search section 111 has a function similar to the starting point determination unit 1 shown in FIG. 2 and the search result mentioned above may be displayed by a method described in the first embodiment.

At step SA3, the link-data display control section 112 as shown in FIG. 20, performs a link-data display process to display link data that is related to COMPANY A mentioned above (refer to FIG. 19) which is selected by the user.

Concretely, at step SB1 shown in FIG. 16, the link-data display control section 112 refers to the link database 121 (refer to FIG. 12) and acquires from each URL first level data corresponding to object ID list of COMPANY A (object ID F000001).

At step SB2, the link-data display control section 112 determines a main display range of the first level data in a local map area 230 shown in FIG. 20. For example, the link-data display control section 112 displays 12 main first level data in a main display range of 4×3 (height×width) and decides to display first level data that could not be displayed in the main display range by overlapping in a direction of depth.

At step SB3, the link-data display control section 112 rearranges the first level data based on the attribute. At step SB4, the link-data display control section 112 acquires second level data that is linked with each first level data.

Concretely, the link-data display control section 112 refers to the link database 121 (refer to FIG. 12) and acquires second level data that corresponds to the object ID list of each first level data from each URL.

At step SB5, the link-data display control section 112, based on a result of the rearrangement at step SB3, disposes each first level data and disposes second level data that is linked, around each first level data. Furthermore, each first level data that is not in the main display range is disposed such that it is overlapped in the direction of depth.

At step SB6, the link-data display control section 112 based on disposing at step SB5, displays first level data $231_1$, $231_2$, . . . , $231_a$, . . . and second level data $232_{11}$, $232_{12}$ etc. in the local map area 230 shown in FIG. 20 in the form of icons.

For example, around the first level data $231_1$, the second level data $232_{11}$, $232_{12}$, $232_{13}$, . . . that are linked to the first level data $231_1$ are displayed. Around the first level data $231_2$, second level data $232_{21}$, $232_{22}$, . . . that are linked to the first level data 2312 are displayed. Similarly, around the first level data $231_a$, second level data $232_{a1}$, $232_{a2}$, . . . that are linked to the first level data $231_a$ are displayed.

Here, for the display in the form of icons, the first level data and the second level data are displayed by icons of different shapes corresponding to attributes etc.

At step SB7, the link-data display control section 112 displays each second level data that is displayed in the local map area 230 while rotating around the first level data.

AT step SB8, the link-data display control section 112 makes a judgment of whether a scroll instruction (command) to scroll display of the local map area 230 is there. Concretely, the link-data display control section 112 makes a judgment of whether any of a left-scroll button 270, a return button 271, and a right-scroll button 272 is pressed by the user.

The left-scroll button 270 is for scrolling the display of the local map area 230 to left by a predetermined amount and displaying the first level data that is displayed by overlapping in the direction of depth on right side, in the main display range. The return button 271 is for returning the local map area 230 to a display a condition before scrolling. The right-scroll button 272 is for scrolling the display of the local map area 230 to right by a predetermined amount and displaying the first level data (omitted in the diagram) that is displayed by overlapping in the direction of depth on left side.

If the judgment at step SB8 is Yes, at step SB10, the link-data display control section 112 executes scroll process of scrolling the display of the local map area 230. The user, while pressing the left-scroll button 270, the return button 271, and the right scroll button 272, displays the desired first level data in the main display range.

Whereas, if the judgment at step SB8 is No, at step SB9, the link-data display control section 112 makes a judgment of whether the desired first level data is selected by the user from the plurality of first level data displayed in the local map area 230 and sets a judgment result as No.

If the first level data 231a (Mr. Ken-ichi Hasegawa) displayed in the local map area 230 shown in FIG. 20 is selected by the user, the link-data display control section 112 sets the judgment result at step SB9 as Yes and ends the link-data display process. If the judgment result at step SB9 is No, process from step SB7 onward is executed.

Coming back to FIG. 15, at step SA4, the history-data display control section 113 as shown in FIG. 21, executes a history-data display process for displaying history thumbnail icons as history data in a history view area 240.

Concretely, at step SC1 shown in FIG. 17, the history-data display control section 113 reduces the size of a display image of the local map area 230 just before selecting the first level data at step SB9 (refer to FIG. 16) and acquires this as a history thumbnail image (in this case, displayed in a display area 240a; refer to FIG. 21).

At step SC2, the history-data display control section 113 associates a history data ID, an object ID of the first level data corresponding to the thumbnail image, and a date to the history thumbnail image, then stores as history data in the history database 122 (refer to FIG. 13), and updates the history database 122.

At step SC3, the history-data display control section 113 makes a judgment of if the number of thumbnail images displayed in the history view area 24 is greater than the regulated number. This regulated number is a number of display areas 240a to 240d (=4) in the history view area 240.

If a judgment result at step SC3 is Yes, at step SC4, the history-data display control section 113 deletes the oldest history data of date and time from the history database 122 (refer to FIG. 13) and also deletes history thumbnail images corresponding to the history data from the history view area 240.

In this case, let the judgment result at step SC3 be No. Then, at step SC5, the history-data display control section 113, displays new thumbnail images that are stored in the history database 122 at step SC2 in the history view area 240 shown in FIG. 21 and ends the history-data display process. The history thumbnail images displayed in the display area 240a correspond to display content of the local map area 230 shown in FIG. 20.

Coming back to FIG. 15, at step SA5, the positioning supporting section 114 displays a global map in the global map area 260 (refer to FIG. 21) and executes positioning support process for supporting the positioning.

Concretely, at step SD1 shown in FIG. 18, the positioning supporting section 114 stores an object ID (in this case, F056894), an attribute (in this case, personnel), and a date (in this case, Aug. 7, 1986) related to the first level data $231_a$ (refer to FIG. 20) selected by the user at step SB9 (refer to FIG. 16) are stored in the positioning database 123 and updated.

At step SD2, the positioning supporting section 114 displays a layout point $261_2$ to the area 260c (personnel) corresponding to the attribute (in this case personnel) of the first level data $231_a$ (refer to FIG. 20) in the global map area 260 shown in FIG. 21.

At step SD3, the positioning supporting section 114 displays a line $262_1$ that connects the layout points $261_1$ and $261_2$ and ends the positioning support process. Due to this, the user can know generally that data related to the personnel linked to the data related to the company is traced after the data related to the company in the data group.

Coming back to FIG. 15, at step SA6, a judgment of whether another search is there is made and if a judgment result is Yes, the process from step SA1 onward is executed. Whereas, if the judgment result at step SA6 is No, at step SA3, the link-data display process related to the first level data (refer to FIG. 20) selected at step SB9 (refer to FIG. 16) is executed.

Concretely, at step SB1 shown in FIG. 16, the link-data display control section 112 refers to the link database 121 (refer to FIG. 12) and acquires from each URL first level data corresponding to the object ID list of the first level data 231a (refer to FIG. 20).

At step SB2, the link-data display control section 112 determines a main display range of the first level data in the local map area 230 shown in FIG. 20.

At step SB3, the link-data display control section 112 rearranges the first level data based on the attribute. At step SB4, the link-data display control section 112 acquires second level data that is linked with each first level data.

At step SB5, the link-data display control section 112, based on a result of the rearrangement at step SB3, disposes each first level data and disposes second level data that is linked, around each first level data. Furthermore, each first level data that is not in the main display range is disposed such that it is overlapped in the direction of depth.

At step SB6, the link-data display control section, based on disposing at step SB5, displays first level data $232_{a1}$, $232_{a2}$, ..., $232_{a8}$, ... and second level data $233_{a11}$, $233_{a12}$, ..., $233_{a81}$, $233_{a82}$, ... in the local map area 230 shown in FIG. 20, in the form of icons. The first level data $232_{a1}$, $232_{a2}$, ..., $232_{a8}$, ... is second layer data $232_{a1}$, $232_{a2}$, ... linked to the first level data $231_a$ shown in FIG. 20. Here, since the first level data shown in FIG. 21 and the second level data shown in FIG. 20 are same, for the sake of convenience, the same reference numerals are used for the two.

At step SB7, the link-data display control section 112 displays each second level data that is displayed in the local map area 230 while rotating around the first level data.

AT step SB8, the link-data display control section 112 makes a judgment of whether a scroll instruction to scroll display of the local map area is there. If a judgment result at step SB8 is Yes, at step SB10, the link-data display control section 112 executes scroll process of scrolling the display of the local map area 230.

At step SB9, the link-data display control section 112 makes a judgment of whether the desired first level data is selected by the user from the plurality of first level data displayed in the local map area 230. Here, if the first level data $232_{a8}$ (1st development department) that is displayed in the local map area shown in FIG. 21 is selected by the user, the link-data display control section 112 sets a judgment result at step SB9 as Yes and ends the link-data display process.

From here onward, by executing the process from step SA4 shown in FIG. 15 onward, thumbnail images corresponding to the local map area 230 shown in FIG. 21 are displayed in a display area 240b in the history view area 240 on the screen 200 shown in FIG. 22. Moreover, first level data $233_{a81}$, $233_{a82}$, ... and second level data $234_{a811}$, $234_{a812}$, ... that are linked to the first level data $232_{a8}$ are displayed in the local map area 230.

The first level data $233_{a81}$, $233_{a82}$, ... are second level data $233_{a81}$, $233_{a82}$, ... that are linked to the first level data $232_{a8}$. Here, since the first level data shown in FIG. 22 and the second level data shown in FIG. 21 are same, for the sake of convenience, the same reference numerals are used for the two.

Furthermore, a layout point $261_3$ (area 260b) corresponding to the first level data $232_{a8}$ (refer to FIG. 21) and a line $262_2$ that connects the layout point $261_3$ and the layout point $261_2$ are displayed in the global map area 260.

Thus, as explained above, according to the second embodiment, as shown in the local map area 230 in FIG. 20, while displaying the data, data that is linked from (to) the first level data is referred to as second level data and the second level data is displayed in the form of icons around the first level data. Therefore, links of the data groups that are linked mutually can be displayed efficiently.

The first embodiment and the second embodiment of the present invention are explained above in detail with reference to diagrams. However, the present invention is not limited to the first and the second embodiment and any modifications and changes within a scope that do not deviate the basic idea of the present invention are included in the present invention.

For example, in the embodiments mentioned above, a computer program that realizes functions of the first and the second embodiment may be recorded in a computer readable recording medium and the computer program recorded in the recording medium allowed to be read and executed by a computer so that each function is realized.

INDUSTRIAL APPLICABILITY

As mentioned above, an information navigation system according to the present invention is useful for search and display of data groups that are mutually linked.

The invention claimed is:

1. A computer readable storage medium having instructions encoded thereon, when executed by a computer cause the computer to execute operations comprising:
   displaying on a display section a plurality of first data points of a group of data of a plurality of groups of data as candidates for a starting point from where information navigation through the group of data of the plurality of groups of data starts, and supporting a user to select one of the plurality of the first data points as the starting point;
   providing the user with a first image indicating the selected starting point and a second data point of the group of data of the plurality of groups of data, the second data point linked to the starting point to allow the user to select data to be browsed next on the display section; and
   providing the user with a global information navigation map indicating all data points of all the plurality of groups of data, including indication of the starting point, the second data point and the link between the starting point and the second data point, indicating interrelationship among all the data points of all the plurality of groups of data, and indicating in the global information navigation map a current browsing position showing which one of the data points from all the data points of all the plurality of groups of data is a data point currently being browsed,
   wherein the first image shows the starting point as a first level data and the second data point as a second level data by icons indicating attributes of level data and configurable to moving the icon of the second level data to around the icon of the first level data, and
   wherein the current browsing position and the link that has been traced are displayed by a specific color.

2. The computer readable storage medium according to claim 1, further having instructions encoded thereon causing the computer to further execute operations comprising:
   receiving a keyword input by the user;
   extracting from the group of data a plurality of data related to the keyword; and
   classifying the extracted plurality of data into a plurality of groups based on a number of links between the extracted data.

3. The computer readable storage medium according to claim 1, wherein each of the starting point and the second data point is shown in the first image as an icon and label which indicate an attribute and content of the data to be displayed.

4. The computer readable storage medium according to claim 1, further having instructions encoded thereon causing the computer to further execute providing the user with history information of links that have been traced and data points that have been browsed on the global information navigation map.

5. The computer readable storage medium according to claim 1, further having instructions encoded thereon causing the computer to further execute switching between the first image and the global information navigation map according to an operation by the user.

6. The computer readable storage medium according to claim 1, further having instructions encoded thereon causing the computer to further execute providing the user a history image showing the first image shown in the past, wherein the first image shown in the past shows an arrangement of the first level data and the second level data shown in the past.

7. The computer readable storage medium according to claim 1, wherein the first image shows the icon of the second level data around the icon of the first level data.

8. A method for information navigation on a computer, comprising:
   displaying a list of potential first data points of a group of data of a plurality of groups of data to a user using a computer;
   selecting by the user one of the first data points of the group of data of the plurality of groups of data as a starting point;
   displaying a first image indicating the selected starting point and a navigable second data point of the group of data of the plurality of groups of data, the second data point linked to the starting point; and
   displaying a global information navigation map indicating all data points of all the plurality of groups of data, including indication of the starting point, the second data point and the link between the starting point and the second data point, indicating interrelationship among all the data points of all the plurality of groups of data, and indicating in the global information navigation map a current browsing position showing which one of the data points from all the data points of all the plurality of groups of data is a data point currently being browsed,
   wherein the first image shows the starting point as a first level data and the second data point as a second level data by icons indicating attributes of level data and configurable to moving the icon of the second level data to around the icon of the first level data, and
   wherein the current browsing position and the link that has been traced are displayed by a specific color.

9. An information navigation apparatus, comprising:
   a display device displaying a list of potential first data points of a group of data of a plurality of groups of data to a user; and
   a computer processor
      supporting the user to select one of the first data points of the group of data of the plurality of groups of data displayed on the display device,
      displaying a first image indicating the selected starting point and a navigable second data point of the group of data of the plurality of groups of data, the second data point linked to the starting point on the display device, wherein the first image shows the starting point as a first level data and the second data point as a second level data by icons indicating attributes of level data and configurable to moving the icon of the second level data to around the icon of the first level data,
      displaying on the display device a global information navigation map indicating all data points of all the plurality of groups of data, including indication of the starting point, the second data point and the link between the starting point and the second data point, indicating interrelationship among all the data points of all the plurality of groups of data, and indicating in the global information navigation map a current browsing position showing which one of the data points from all the data points of all the plurality of groups of data is a data point currently being browsed, and
      displaying the current browsing position and the link that has been traced on the display device in a specific color.

* * * * *